United States Patent
Shah et al.

(10) Patent No.: US 10,474,762 B2
(45) Date of Patent: Nov. 12, 2019

(54) METHODS AND SYSTEMS TO COMMUNICATE INFORMATION

(71) Applicant: eBay Inc., San Jose, CA (US)

(72) Inventors: Seema Shah, San Francisco, CA (US); Adam Nash, Sunnyvale, CA (US); Raghav Gupta, Sunnyvale, CA (US); Aditya Arora, Pleasanton, CA (US); Benjamin David Foster, Arlington, VA (US); Srikanth Subramaniam, San Jose, CA (US); Suhail Ansari, Sunnyvale, CA (US); Xavier Stonestreet, Aptos, CA (US); Vijay Raman, Santa Clara, CA (US); Jean-Michel Leon, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 15/254,210

(22) Filed: Sep. 1, 2016

(65) Prior Publication Data
US 2016/0371377 A1    Dec. 22, 2016

Related U.S. Application Data

(63) Continuation of application No. 11/478,666, filed on Jun. 30, 2006, now Pat. No. 9,443,333.
(Continued)

(51) Int. Cl.
*G06F 17/30* (2006.01)
*G06T 11/20* (2006.01)

(52) U.S. Cl.
CPC .. *G06F 17/30864* (2013.01); *G06F 17/30389* (2013.01); *G06F 17/30477* (2013.01); *G06T 11/206* (2013.01)

(58) Field of Classification Search
CPC ........ G06F 17/30389; G06F 17/30864; G06F 17/30477; G06T 11/206
See application file for complete search history.

(56) References Cited

U.S. PATENT DOCUMENTS 5,297,039 A    3/1994   Kanaegami et al.
5,428,778 A    6/1995   Brookes
(Continued)

FOREIGN PATENT DOCUMENTS

WO    WO-04025391 A2    3/2004
WO    WO-04070626 A2    8/2004
(Continued)

OTHER PUBLICATIONS

Simanek, Distribution of Measurements, 2004, 8 pages.*
(Continued)

*Primary Examiner* — Albert M Phillips, III
(74) *Attorney, Agent, or Firm* — Shook, Hardy & Bacon, L.L.P.

(57) ABSTRACT

Systems and methods to communicate information are described. The system receives a query and retrieves a set of data items from a database based on the query. The system generates a distribution based on a count of data items from the set of data items that were retrieved for each domain in a set of domains and a count of requests to view data items from another set of data items for each domain in the set of domains. The system identifies whether the distribution exhibits a type of a distribution by comparing the distribution with at least one of a peak distribution and a hills distribution. Finally, the system generates interface information based on the type of distribution.

20 Claims, 21 Drawing Sheets

Related U.S. Application Data

(60) Provisional application No. 60/743,256, filed on Feb. 9, 2006, provisional application No. 60/781,521, filed on Mar. 10, 2006, provisional application No. 60/745,347, filed on Apr. 21, 2006.

(56) References Cited

U.S. PATENT DOCUMENTS

| | | |
|---|---|---|
| 5,752,025 A | 5/1998 | Shakib et al. |
| 5,778,357 A | 7/1998 | Kolton et al. |
| 5,787,421 A | 7/1998 | Nomiyama |
| 5,845,278 A | 12/1998 | Kirsch et al. |
| 5,864,846 A | 1/1999 | Voorhees |
| 5,918,214 A | 6/1999 | Perkowski |
| 5,987,470 A | 11/1999 | Meyers et al. |
| 6,009,422 A | 12/1999 | Ciccarelli |
| 6,182,029 B1 | 1/2001 | Friedman |
| 6,185,558 B1 | 2/2001 | Bowman et al. |
| 6,336,112 B2 | 1/2002 | Chakrabarti et al. |
| 6,336,910 B1 | 1/2002 | Ohta et al. |
| 6,532,427 B1 | 3/2003 | Joshi et al. |
| 6,574,616 B1 | 6/2003 | Saghir |
| 6,714,934 B1 | 3/2004 | Fordham |
| 6,751,606 B1 | 6/2004 | Fries et al. |
| 6,816,611 B1 | 11/2004 | Hagiwara et al. |
| 6,832,205 B1 | 12/2004 | Aragones et al. |
| 6,847,960 B1 | 1/2005 | Li et al. |
| 6,961,712 B1 | 11/2005 | Perkowski |
| 6,963,867 B2 | 11/2005 | Ford et al. |
| 6,983,449 B2 | 1/2006 | Newman |
| 7,051,017 B2 | 5/2006 | Marchisio |
| 7,051,023 B2 | 5/2006 | Kapur et al. |
| 7,058,599 B2 | 6/2006 | Hanks et al. |
| 7,124,125 B2 | 10/2006 | Cook et al. |
| 7,240,049 B2 | 7/2007 | Kapur |
| 7,290,007 B2 | 10/2007 | Farber et al. |
| 7,293,033 B1 | 11/2007 | Tormasov et al. |
| 7,330,830 B1* | 2/2008 | Lamoureux ............ G06Q 30/00 705/30 |
| 7,346,629 B2 | 3/2008 | Kapur et al. |
| 7,370,023 B1 | 5/2008 | Forsythe et al. |
| 7,389,283 B2 | 6/2008 | Adler |
| 7,395,259 B2 | 7/2008 | Bailey et al. |
| 7,587,357 B1 | 9/2009 | Buck |
| 7,640,234 B2 | 12/2009 | Shah et al. |
| 7,725,417 B2 | 5/2010 | Loftus et al. |
| 7,739,225 B2 | 6/2010 | Loftus et al. |
| 7,739,226 B2 | 6/2010 | Loftus et al. |
| 7,849,047 B2 | 12/2010 | Loftus et al. |
| 8,046,321 B2 | 10/2011 | Loftus et al. |
| 8,055,641 B2 | 11/2011 | Shah et al. |
| 8,244,666 B2 | 8/2012 | Loftus et al. |
| 8,380,698 B2 | 2/2013 | Sundaranatha |
| 8,396,892 B2 | 3/2013 | Loftus et al. |
| 8,521,712 B2 | 8/2013 | Shah et al. |
| 8,688,623 B2 | 4/2014 | Shah et al. |
| 8,909,594 B2 | 12/2014 | Loftus et al. |
| 9,443,333 B2 | 9/2016 | Shah et al. |
| 2002/0004735 A1 | 1/2002 | Gross |
| 2002/0027567 A1 | 3/2002 | Niamir |
| 2002/0107786 A1* | 8/2002 | Lehmann-Haupt .... G06Q 30/02 705/37 |
| 2002/0152199 A1 | 10/2002 | Teng et al. |
| 2002/0174089 A1 | 11/2002 | Tenorio |
| 2002/0198962 A1 | 12/2002 | Horn et al. |
| 2003/0018621 A1 | 1/2003 | Steiner et al. |
| 2003/0078860 A1 | 4/2003 | Hoffman |
| 2003/0078915 A1 | 4/2003 | Chaudhuri et al. |
| 2003/0115438 A1 | 6/2003 | Mahalingam et al. |
| 2003/0126117 A1 | 7/2003 | Megiddo et al. |
| 2003/0158839 A1 | 8/2003 | Faybishenko et al. |
| 2003/0167252 A1 | 9/2003 | Odom et al. |
| 2004/0019494 A1* | 1/2004 | Ridgeway .......... G06Q 10/0637 705/26.1 |
| 2004/0019588 A1 | 1/2004 | Doganata et al. |
| 2004/0030690 A1 | 2/2004 | Teng et al. |
| 2004/0039657 A1 | 2/2004 | Behrens et al. |
| 2004/0039731 A1 | 2/2004 | Levy |
| 2004/0049514 A1 | 3/2004 | Burkov |
| 2004/0068460 A1 | 4/2004 | Feeley et al. |
| 2004/0068697 A1 | 4/2004 | Harik et al. |
| 2004/0090472 A1 | 5/2004 | Risch et al. |
| 2004/0117189 A1 | 6/2004 | Bennett |
| 2004/0163043 A1 | 8/2004 | Baudin et al. |
| 2004/0193506 A1* | 9/2004 | Zmolek .................. G06Q 10/10 705/26.1 |
| 2004/0199498 A1 | 10/2004 | Kapur et al. |
| 2004/0243501 A1 | 12/2004 | Duffey |
| 2004/0243565 A1 | 12/2004 | Elbaz et al. |
| 2004/0249801 A1 | 12/2004 | Kapur |
| 2004/0254920 A1 | 12/2004 | Brill et al. |
| 2005/0060320 A1 | 3/2005 | Bostrom |
| 2005/0080769 A1 | 4/2005 | Gemmell et al. |
| 2005/0080775 A1 | 4/2005 | Colledge et al. |
| 2005/0080776 A1 | 4/2005 | Colledge et al. |
| 2005/0080795 A1 | 4/2005 | Kapur et al. |
| 2005/0086210 A1 | 4/2005 | Kita et al. |
| 2005/0102259 A1 | 5/2005 | Kapur |
| 2005/0144086 A1 | 6/2005 | Speiser et al. |
| 2005/0177561 A1 | 8/2005 | Ramanathan et al. |
| 2005/0198105 A1 | 9/2005 | Schmitz et al. |
| 2006/0041521 A1 | 2/2006 | Oral et al. |
| 2006/0064411 A1 | 3/2006 | Gross et al. |
| 2006/0072830 A1 | 4/2006 | Nagarajan et al. |
| 2006/0106793 A1 | 5/2006 | Liang |
| 2006/0122979 A1 | 6/2006 | Kapur et al. |
| 2006/0129529 A1 | 6/2006 | Adler |
| 2006/0159356 A1 | 7/2006 | Bruna et al. |
| 2006/0176479 A1 | 8/2006 | Laurence et al. |
| 2006/0195428 A1 | 8/2006 | Peckover |
| 2006/0195563 A1 | 8/2006 | Chapin |
| 2006/0212142 A1 | 9/2006 | Madani et al. |
| 2006/0248074 A1 | 11/2006 | Carmel et al. |
| 2006/0287980 A1 | 12/2006 | Liu et al. |
| 2007/0106499 A1 | 5/2007 | Dahlgren et al. |
| 2007/0174270 A1 | 7/2007 | Goodwin et al. |
| 2007/0185839 A1 | 8/2007 | Shah et al. |
| 2007/0198496 A1 | 8/2007 | Loftus et al. |
| 2007/0198497 A1 | 8/2007 | Loftus et al. |
| 2007/0198498 A1 | 8/2007 | Loftus et al. |
| 2007/0198501 A1 | 8/2007 | Sundaranatha |
| 2007/0200850 A1 | 8/2007 | Shah et al. |
| 2007/0260598 A1 | 11/2007 | Odom |
| 2008/0016019 A1 | 1/2008 | Loftus et al. |
| 2008/0162424 A1 | 7/2008 | Adler |
| 2008/0276125 A1 | 11/2008 | Akelbein et al. |
| 2008/0276201 A1 | 11/2008 | Risch et al. |
| 2010/0145928 A1 | 6/2010 | Shah et al. |
| 2010/0217741 A1 | 8/2010 | Loftus et al. |
| 2010/0250535 A1 | 9/2010 | Loftus et al. |
| 2011/0082872 A1 | 4/2011 | Loftus |
| 2011/0106785 A1 | 5/2011 | Loftus et al. |
| 2011/0119246 A1 | 5/2011 | Loftus et al. |
| 2012/0150832 A1 | 6/2012 | Shah et al. |
| 2012/0290550 A1 | 11/2012 | Shah et al. |
| 2012/0310946 A1 | 12/2012 | Loftus et al. |
| 2015/0095302 A1 | 4/2015 | Loftus et al. |

FOREIGN PATENT DOCUMENTS

| | | |
|---|---|---|
| WO | WO-2007095075 A2 | 8/2007 |
| WO | WO-2007095075 A3 | 8/2007 |
| WO | WO-2007106401 A2 | 9/2007 |
| WO | WO-2007106401 A3 | 9/2007 |
| WO | WO-2007106403 A2 | 9/2007 |
| WO | WO-2007106403 A3 | 9/2007 |

OTHER PUBLICATIONS

"U.S. Appl. No. 11/478,666, Advisory Action dated Feb. 11, 2011", 6 pgs.

"U.S. Appl. No. 11/478,666, Advisory Action dated Feb. 18, 2010", 10 pgs.

(56) References Cited

OTHER PUBLICATIONS

"U.S. Appl. No. 11/478,666, Amendment filed Oct. 1, 2014", 11 pgs.
"U.S. Appl. No. 11/478,666, Appeal Brief filed Apr. 14, 2011", 26 pgs.
"U.S. Appl. No. 11/478,666, Appeal Decision dated May 19, 2014", 9 pgs.
"U.S. Appl. No. 11/478,666, Decision on Pre-Appeal Brief Request filed Mar. 14, 2011", 2 pgs.
"U.S. Appl. No. 11/478,666, Decision on Pre-Appeal Brief Request dated Apr. 2, 2010", 2 pgs.
"U.S. Appl. No. 11/478,666, Examiner's Answer to Appeal Brief dated May 20, 2011", 21 pgs.
"U.S. Appl. No. 11/478,666, Final Office Action dated Nov. 23, 2009", 16 pgs.
"U.S. Appl. No. 11/478,666, Final Office Action dated Nov. 26, 2010", 16 pgs.
"U.S. Appl. No. 11/478,666, Non Final Office Action dated May 6, 2009", 21 pgs.
"U.S. Appl. No. 11/478,666, Non Final Office Action dated Nov. 5, 2015", 6 pgs.
"U.S. Appl. No. 11/478,666, Non-Final Office Action dated Jun. 10, 2010", 13 pgs.
"U.S. Appl. No. 11/478,666, Notice of Allowance dated May 6, 2016", 5 pgs.
"U.S. Appl. No. 11/478,666, Pre-Appeal Brief Request filed Feb. 23, 2010", 5 pgs.
"U.S. Appl. No. 11/478,666, Pre-Appeal Brief Request filed Feb. 28, 2011", 5 pgs.
"U.S. Appl. No. 11/478,666, Reply Brief filed Jul. 15, 2011", 13 pgs.
"U.S. Appl. No. 11/478,666, Response filed Jan. 25, 2010 to Final Office Action dated Nov. 23, 2009", 17 pgs.
"U.S. Appl. No. 11/478,666, Response filed Jan. 26, 2011 to Final Office Action dated Jan. 26, 2010", 14 pgs.
"U.S. Appl. No. 11/478,666, Response filed Feb. 5, 2016 to Non Final Office Action dated Nov. 5, 2015", 9 pgs.
"U.S. Appl. No. 11/478,666, Response filed Jul. 22, 2009 to Non Final Office Action dated May 6, 2009", 11 pgs.
"U.S. Appl. No. 11/478,666, Response filed Sep. 10, 2010 to Non Final Office Action dated Jun. 10, 2010", 11 pgs.
"U.S. Appl. No. 11/497,976, Advisory Action dated May 29, 2009", 3 pgs.
"U.S. Appl. No. 11/497,976, Final Office Action dated Mar. 17, 2009", 13 pgs.
"U.S. Appl. No. 11/497,976, Non-Final Office Action dated Sep. 30, 2008", 11 pgs.
"U.S. Appl. No. 11/497,976, Notice of Allowance dated Aug. 14, 2009", 19 pgs.
"U.S. Appl. No. 11/497,976, Response filed May 18, 2009 to Final Office Action dated Mar. 17, 2009", 13 pgs.
"U.S. Appl. No. 11/497,976, Response filed Dec. 30, 2008 to Non Final Office Action dated Sep. 30, 2008", 12 pgs.
"U.S. Appl. No. 11/703,451, 312 Amendment filed Apr. 7, 2010", 3 pgs.
"U.S. Appl. No. 11/703,451, Non Final Office Action dated May 14, 2009", 24 pgs.
"U.S. Appl. No. 11/703,451, Notice of Allowance dated Jan. 7, 2010", 16 pgs.
"U.S. Appl. No. 11/703,451, PTO Response to 312 Amendment dated Apr. 21, 2010", 2 pgs.
"U.S. Appl. No. 11/703,451, Response filed Sep. 11, 2009 to Non Final Office Action dated May 14, 2009", 18 pgs.
"U.S. Appl. No. 11/703,485, Advisory Action dated Dec. 10, 2009", 3 pgs.
"U.S. Appl. No. 11/703,485, Final Office Action dated Aug. 7, 2009", 8 pgs.
"U.S. Appl. No. 11/703,485, Non-Final Office Action dated Feb. 17, 2009", 9 pgs.
"U.S. Appl. No. 11/703,485, Notice of Allowance dated Mar. 30, 2010", 5 pgs.
"U.S. Appl. No. 11/703,485, Notice of Allowance dated Jul. 26, 2010", 9 pgs.
"U.S. Appl. No. 11/703,485, Response filed Feb. 5, 2010 to Advisory Action dated Dec. 10, 2009", 8 pgs.
"U.S. Appl. No. 11/703,485, Response filed May 15, 2009 to Non Final Office Action dated Feb. 17, 2009", 15 pgs.
"U.S. Appl. No. 11/703,485, Response filed Nov. 9, 2009 to Final Office Action dated Aug. 7, 2009", 12 pgs.
"U.S. Appl. No. 11/703,509, 312 Amendment filed Dec. 7, 2012", 10 pgs.
"U.S. Appl. No. 11/703,509, Advisory Action dated Mar. 2, 2010", 3 pgs.
"U.S. Appl. No. 11/703,509, Advisory Action dated Apr. 8, 2011", 3 pgs.
"U.S. Appl. No. 11/703,509, Advisory Action dated Apr. 12, 2012", 2 pgs.
"U.S. Appl. No. 11/703,509, Decision on Pre-Appeal Brief Request dated Apr. 21, 2010", 2 pgs.
"U.S. Appl. No. 11/703,509, Final Office Action dated Jan. 26, 2011", 45 pgs.
"U.S. Appl. No. 11/703,509, Final Office Action dated Jan. 30, 2012", 26 pgs.
"U.S. Appl. No. 11/703,509, Final Office Action dated Dec. 2, 2009", 24 pgs.
"U.S. Appl. No. 11/703,509, Non Final Office Action dated Aug. 5, 2011", 23 pgs.
"U.S. Appl. No. 11/703,509, Non-Final Office Action dated May 15, 2009", 24 pgs.
"U.S. Appl. No. 11/703,509, Non-Final Office Action dated Jul. 23, 2010", 42 pgs.
"U.S. Appl. No. 11/703,509, Notice of Allowance dated Jul. 13, 2012", 24 pgs.
"U.S. Appl. No. 11/703,509, Notice of Allowance dated Sep. 7, 2012", 21 pgs.
"U.S. Appl. No. 11/703,509, Pre-Appeal Brief Request filed Mar. 2, 2010", 5 pgs.
"U.S. Appl. No. 11/703,509, PTO Response to 312 Amendment dated Jan. 24, 2013", 2 pgs.
"U.S. Appl. No. 11/703,509, Response filed Feb. 2, 2010 to Final Office Action dated Dec. 2, 2009", 15 pgs.
"U.S. Appl. No. 11/703,506, Response filed Mar. 25, 2011 to Final Office Action dated Jan. 26, 2011", 21 pgs.
"U.S. Appl. No. 11/703,509, Response filed Mar. 30, 2012 to Final Office Action dated Jan. 30, 2012", 13 pgs.
"U.S. Appl. No. 11/703,509, Response filed Apr. 30, 2012 to Advisory Action dated Jan. 30, 2012", 15 pgs.
"U.S. Appl. No. 11/703,509, Response filed Aug. 17, 2009 to Non Final Office Action dated May 15, 2009", 16 pgs.
"U.S. Appl. No. 11/703,509, Response filed Oct. 25, 2010 to Non Final Office Action dated Jul. 23, 2010", 16 pgs.
"U.S. Appl. No. 11/703,509, Response filed Dec. 5, 2011 to Non-Final Office Action dated Aug. 5, 2011", 14 pgs.
"U.S. Appl. No. 11/703,509, Response filed Apr. 26, 2011 to Final Office Action dated Jan. 26, 2011", 21 pgs.
"U.S. Appl. No. 11/703,511, Advisory Action dated Dec. 9, 2009", 3 pgs.
"U.S. Appl. No. 11/703,511, Final Office Action dated Aug. 7, 2009", 8 pgs.
"U.S. Appl. No. 11/703,511, Non-Final Office Action dated Feb. 18, 2009", 9 pgs.
"U.S. Appl. No. 11/703,511, Notice of Allowance dated Mar. 29, 2010", 4 pgs.
"U.S. Appl. No. 11/703,511, Response filed Feb. 5, 2010 to Advisory Action dated Dec. 9, 2009", 9 pgs.
"U.S. Appl. No. 11/703,511, Response filed May 15, 2009 to Non Final Office Action dated Feb. 18, 2009", 16 pgs.
"U.S. Appl. No. 11/703,511, Response filed Nov. 9, 2009 to Final Office Action dated Aug. 7, 2009", 13 pgs.
"U.S. Appl. No. 11/703,515, Advisory Action dated Dec. 1, 2009", 2 pgs.

(56) References Cited

OTHER PUBLICATIONS

"U.S. Appl. No. 11/703,515, Final Office Action dated Aug. 10, 2009", 9 pgs.
"U.S. Appl. No. 11/703,515, Non-Final Office Action dated Feb. 17, 2009", 10 pgs.
"U.S. Appl. No. 11/703,515, Notice of Allowance dated Mar. 31, 2010", 8 pgs.
"U.S. Appl. No. 11/703,515, Response filed May 15, 2009 to Non Final Office Action dated Feb. 17, 2009", 16 pgs.
"U.S. Appl. No. 11/703,515, Response filed Oct. 13, 2009 to Final Office Action dated Aug. 10, 2009", 12 pgs.
"U.S. Appl. No. 11/703,515, Response filed Dec. 10, 2009 to Advisory Action dated Dec. 1, 2009", 13 pgs.
"U.S. Appl. No. 12/620,213, Notice of Allowance dated Dec. 20, 2010", 16 pgs.
"U.S. Appl. No. 12/620,213, Notice of Allowance dated Apr. 27, 2011", 15 pgs.
"U.S. Appl. No. 12/777,061, 312 Amendment filed Sep. 7, 2011", 8 pgs.
"U.S. Appl. No. 12/777,061, Non-Final Office Action dated Oct. 7, 2010", 11 pgs.
"U.S. Appl. No. 12/777,061, Notice of Allowance dated Feb. 4, 2011", 11 pgs.
"U.S. Appl. No. 12/777,061, Notice of Allowance dated Jun. 10, 2011", 9 pgs.
"U.S. Appl. No. 12/777,061, Response filed Jan. 7, 2011 to Non Final Office Action dated Oct. 7, 2010", 8 pgs.
"U.S. Appl. No. 12/777,061, Response to 312 Amendment", 2 pgs.
"U.S. Appl. No. 12/815,371, 312 Amendment filed Jun. 20, 2012", 7 pgs.
"U.S. Appl. No. 12/815,371, Non Final Office Action dated Sep. 2, 2011", 6 pgs.
"U.S. Appl. No. 12/815,371, Notice of Allowance dated Mar. 21, 2012", 9 pgs.
"U.S. Appl. No. 12/815,371, Preliminary Amendment filed Sep. 14, 2010", 9 pgs.
"U.S. Appl. No. 12/815,371, PTO Response to 312 Amendment dated Jul. 13, 2012", 2 pgs.
"U.S. Appl. No. 12/815,371, Response filed Jan. 3, 2012 to Non-Final Office Action dated Sep. 2, 2011", 11 pgs.
"U.S. Appl. No. 12/961,465, Non Final Office Action dated Jun. 12, 2012", 7 pgs.
"U.S. Appl. No. 12/961,474, Non Final Office Action dated Apr. 2, 2012", 7 pgs.
"U.S. Appl. No. 12/961,477, Non Final Office Action dated Jun. 12, 2012", 7 pgs.
"U.S. Appl. No. 12/961,477, Notice of Allowance dated Nov. 2, 2012", 7 pgs.
"U.S. Appl. No. 12/961,477, Response filed Sep. 12, 2012 to Non-Final Office Action dated Jun. 12, 2012", 7 pgs.
"U.S. Appl. No. 13/152,862, Non Final Office Action dated Jul. 23, 2013", 8 pgs.
"U.S. Appl. No. 13/152,862, Notice of Allowance dated Nov. 8, 2013", 7 pgs.
"U.S. Appl. No. 13/152,862, Response filed Oct. 23, 2013 to Non Final Office Action dated Jul. 23, 2013", 12 pgs.
"U.S. Appl. No. 13/152,976, Non Final Office Action dated Jul. 12, 2012", 8 pgs.
"U.S. Appl. No. 13/152,976, Notice of Allowance dated Nov. 30, 2012", 8 pgs.
"U.S. Appl. No. 13/152,976, Response filed Oct. 12, 2012 to Non Final Office Action dated Jul. 12, 2012", 11 pgs.
"U.S. Appl. No. 13/584,131, Final Office Action dated Dec. 16, 2013", 10 pgs.
"U.S. Appl. No. 13/584,131, Non Final Office Action dated Jun. 24, 2013", 7 pgs.
"U.S. Appl. No. 13/584,131, Notice of Allowance dated Aug. 4, 2014", 8 pgs.
"U.S. Appl. No. 13/584,131, Response filed Apr. 16, 2014 to Final Office Action dated Dec. 16, 2013", 13 pgs.
"U.S. Appl. No. 13/584,131, Response filed Oct. 24, 2013 to Non Final Office Action dated Jun. 24, 2013", 10 pgs.
"U.S. Appl. No. 14/563,099, Non Final Office Action dated Jun. 7, 2016", 11 pgs.
"U.S. Appl. No. 14/563,099, Preliminary Amendment filed Mar. 9, 2015", 7 pgs.
"U.S. Appl. No. 11/478,666, Examiner Interview Summary dated Feb. 19, 2016", 3 pgs.
"European Application Serial No. 07752788.5, Examination Notification Art. 94(3) dated Aug. 22, 2013", 8 pgs.
"European Application Serial No. 07752788.5, Office Action dated Apr. 9, 2009", 7 pgs.
"European Application Serial No. 07752788.5, Office Action dated Jun. 24, 2011", 4 pgs.
"European Application Serial No. 07752788.5, Response filed Feb. 23, 2012", 14 pgs.
"European Application Serial No. 07752788.5, Response filed May 14, 2014", 12 pgs.
"European Application Serial No. 07752788.5, Response filed Oct. 9, 2009 to Office Action dated Apr. 9, 2009", 25 pgs.
"European Application Serial No. 07752788.5, Summons to Attend Oral Proceedings dated Jul. 22, 2015", 7 pgs.
"International Application Serial No. PCT/US2007/003445, Preliminary Report on Patentability dated Aug. 21, 2008", 7 pgs.
"International Application Serial No. PCT/US2007/003445, International Search Report and Written Opinion dated Sep. 20, 2007", 9 pgs.
"International Application Serial No. PCT/US2007/006102, International Preliminary Report on Patentability dated Sep. 25, 2008", 10 pgs.
"International Application Serial No. PCT/US2007/006102, International Search Report and Written Opinion dated Mar. 17, 2008", 13 pgs.
"International Application Serial No. PCT/US2007/006111, International Search Report and Written Opinion dated Feb. 27, 2008", 8 pgs.
"International Application Serial No. PCT/US2007/006111, Preliminary Report on Patentability dated Sep. 25, 2008", 5 pgs.
Antonie, et al., "An associative classifier based on positive and negative rules", ACM, (2004), 6 pages.
Ding, et al., "GoldenBullet: automated classification of product data in E-commerce", Proceedings of Business Information Systems, Poznan Poland, (2002), 9 pages.
Maria, Nuno, et al., "Theme-based retrieval of Web news", Springer-Verlag Berlin Heidelberg, (2001,), 12 pages.
Yu, C. T, et al., "Automatic Knowledge Acquisition and Maintenance for Semantic Query Optimization", vol. 1, Iss. 3, (Sep. 1989), pp. 362-375.
"U.S. Appl. No. 14/563,099, Final Office Action dated Nov. 23, 2016", 13 pgs.
"U.S. Appl. No. 14/563,099, Notice of Allowance dated Apr. 20, 2017", 8 pgs.
"U.S. Appl. No. 14/563,099, Response filed Feb. 23, 2017 to Final Office Action dated Nov. 23, 2016", 12 pgs.
"U.S. Appl. No. 14/583,099, Response filed Sep. 7, 2016 to Non Final Office Action dated Jun. 7, 2016", 12 pgs.
Non-Final Office Action received for U.S. Appl. No. 15/687,601, dated Oct. 4, 2018, 8 pages.

* cited by examiner

METHODS AND SYSTEMS TO COMMUNICATE INFORMATION

RELATED APPLICATIONS

This application is a continuation of U.S. application Ser. No. 11/478,666, filed on Jun. 30, 2006 which claims the priority benefits of U.S. Provisional Application No. 60/743,256, filed Feb. 9, 2006 and U.S. Provisional Application No. 60/781,521, filed Mar. 10, 2006, and U.S. Provisional Application No. 60/745,347, filed Apr. 21, 2006, all of which are incorporated herein by reference in their entirety.

TECHNICAL FIELD

An embodiment relates generally to the technical field of data communications and, in one example embodiment, to methods and systems to communicate information.

BACKGROUND

A user searching an information resource (e.g., database) may encounter challenges. One such challenge may be that a search mechanism (e.g., a search engine) that is utilized to search the information resource may present search results that are of no interest to the user. For example, the search mechanism may respond to a query from the user with numerous data items that cover a wide spectrum. The user may experiment by adding and removing constraints from the query; however, such experimentation may be time consuming and frustrate the user. Another challenge may be that the search mechanism fails to organize search results on a specific interface in a way that is meaningful to the user.

BRIEF DESCRIPTION OF THE DRAWINGS

An embodiment is illustrated by way of example and not limitation in the figures of the accompanying drawings, in which like references indicate similar elements and in which.

DETAILED DESCRIPTION

Figure 1:
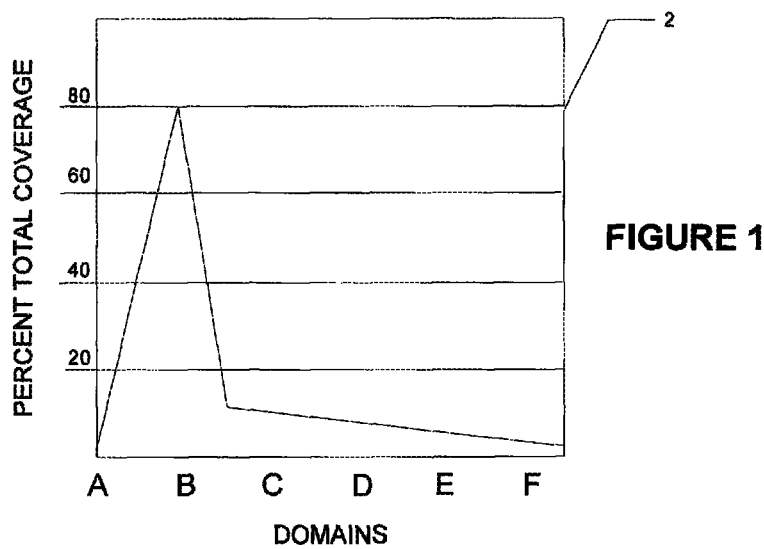
FIG. 1 is a diagram depicting a peak distribution, according to one example embodiment.

Methods and systems to communicate information are described. In the following description, for purposes of explanation, numerous specific details are set forth in order to provide a thorough understanding of the present disclosure. It will be evident, however, to one skilled in the art that the subject matter of the present disclosure may be practiced without these specific details.

A system may communicate information by generating an interface based on supply information and demand information. With regard to the supply information, the system may receive a first query that is entered by a user, identify matching data items, and maintain a set of data item counts for each domain. For example, in response to the first query, the system may find matching data items that may be identified or browsed according to product domain(s) (e.g., shoes), aisle domain(s) (e.g., footwear), and department domain(s) (e.g., apparel), where a department domain may include aisle domain(s) and/or product domains, an aisle domain may include product domain(s), and a product domain may include data items. Continuing with the example, if a data item is found in a Product C domain (e.g., shoes) that is organized under a hierarchy of domains (e.g., Department A—apparel, Aisle B—footwear, Product C—shoes), then the data item counts associated with the Department A, Aisle B and Product C domains may be incremented by one. Domains with high data item counts may be determined to be of interest to the user.

With regard to the demand information, the system may read navigation information that is historical for queries that contains constraints that correspond to the first query over a predetermined period of time. Specifically, the system maintains navigation information in the form of view data item counts according to domains, the view data item counts being incremented responsive to a user viewing a data item. For example, if a user previously entered a second query that contains constraints that correspond to the first query, selected the domain C and viewed a data item, then the view data item count corresponding to the domain C may be incremented by one. The view data item counts may be incremented over a predetermined period of time (e.g., seven days) and then made available as navigation information to generate demand information. For example, navigation information collected for the previous week may be made available as navigation information to generate demand information in the present week. Domains with high data item counts may be determined to be of interest to the user.

The system may maintain the supply information in the form of a product histogram (e.g., percent of data items distributed over multiple product domains), an aisle histogram (e.g., percent of data items distributed over multiple aisle domains), and a department histogram (e.g., percent of data items distributed over multiple department domains). The system may maintain the demand information in a similarly structured set of histograms.

The system may generate total coverage histograms including total coverage information based the supply information that is included in the supply histograms and the demand information that is included in the demand histograms. Specifically, the system may generate a total coverage histogram including total coverage information for product domains, total coverage information for aisle domains, and total coverage information for department domains. The system may compare the total coverage histograms to predetermined distributions including a peak distribution 2, a hills distribution 4, and a flat distribution 6 to identify the type of user interface to generate.

FIG. 1 is a diagram depicting the peak distribution 2, according to one example embodiment. The peak distribution 2 shows a peak with respect to a single domain B. The peak distribution 2 may be a predetermined distribution that is compared with the total coverage histograms to determine whether the total coverage histogram includes total coverage information exhibiting the peak distribution 2. For example, if the system detects a peak distribution 2 in a total coverage histogram including total coverage information for product domains, then the system may generate a product user interface that includes a single product domain based on the position of the peak in the total coverage histogram.

Figure 2:
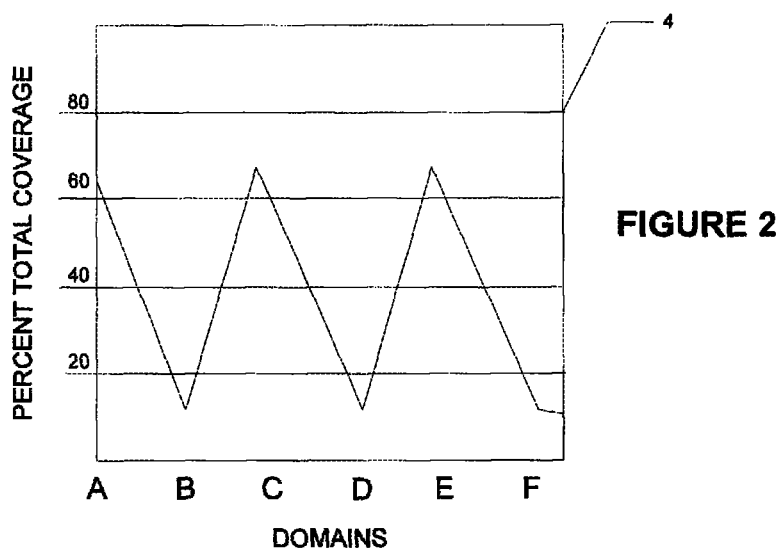
FIG. 2 is a diagram depicting a hills distribution, according to one example embodiment.

FIG. 2 is a diagram depicting the hills distribution 4, according to one example embodiment. The hills distribution 4 shows hills with respect to multiple domains. The hills distribution 4 may be a predetermined distribution that is compared with total coverage histograms to determine whether the total coverage histogram includes total coverage information exhibiting the hills distribution 4. For example, if the system detects a hills distribution 4 in a total coverage histogram including total coverage information for product domains, then the system may generate a cross-product user interface that includes multiple product domains based on the respective position of the hills in the total coverage histogram.

Figure 3:
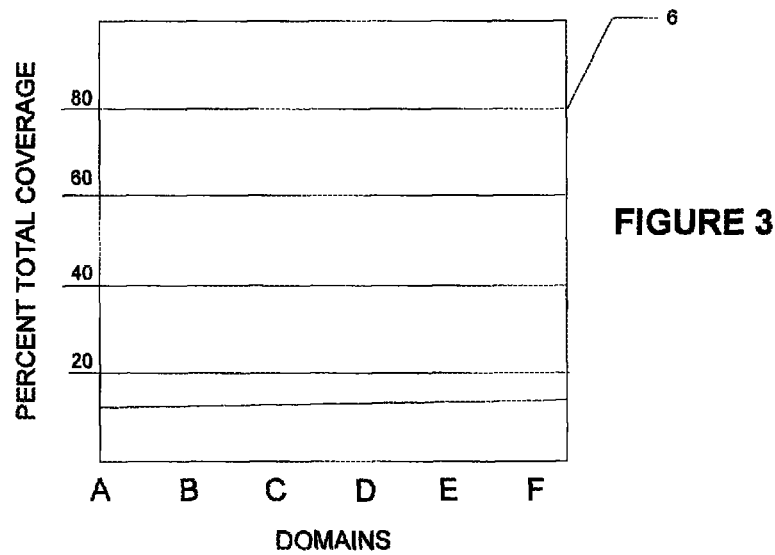
FIG. 3 is a diagram depicting a flat distribution, according to one example embodiment.

FIG. 3 is a diagram depicting the flat distribution 6, according to one example embodiment. The flat distribution 6 is flat with respect to multiple domains. The flat distribution 6 may be a predetermined distribution that is compared with total coverage histograms to determine whether the total coverage histogram includes total coverage information exhibiting the flat distribution 6. For example, if the system detects a flat distribution 6 in a total coverage histogram including total coverage information for product domains, then the system may attempt to detect peak, hills, and flat distributions for total coverage histograms associated with aisle domains. If, on the other hand, the system detects the flat distribution 6 with regard to aisle domains then the system may attempt to detect the peak distribution for total coverage histograms associated with the department domains.

A system may further communicate information by generating an interface. For example, the interface may include a user interface (e.g., cross-product user interface, cross-aisle user interface, cross-department user interface) that includes user interface elements representing domains that may be positioned on the user interface based on the supply and demand information. In one embodiment, the system generates a user interface that includes user interface elements that may be positioned on the user interface in descending order proceeding from a highest total coverage information to the lowest total coverage information. For example, the system may position user interface elements representing departments (e.g., from highest to lowest total coverage) until a predetermined total coverage threshold (eighty percent) is reached or until a predetermined number of user interface elements threshold (e.g., ten), representing departments, may have been positioned on the use interface. In one embodiment, the predetermined total coverage threshold and/or the predetermined number of user interface elements threshold may be configurable. Other examples may include other types of elements (e.g., audio interface elements, machine interface elements, media interface elements) that may be positioned, as described above, on other types of interfaces (e.g., audio interface, machine interface, media interface).

Figure 4:
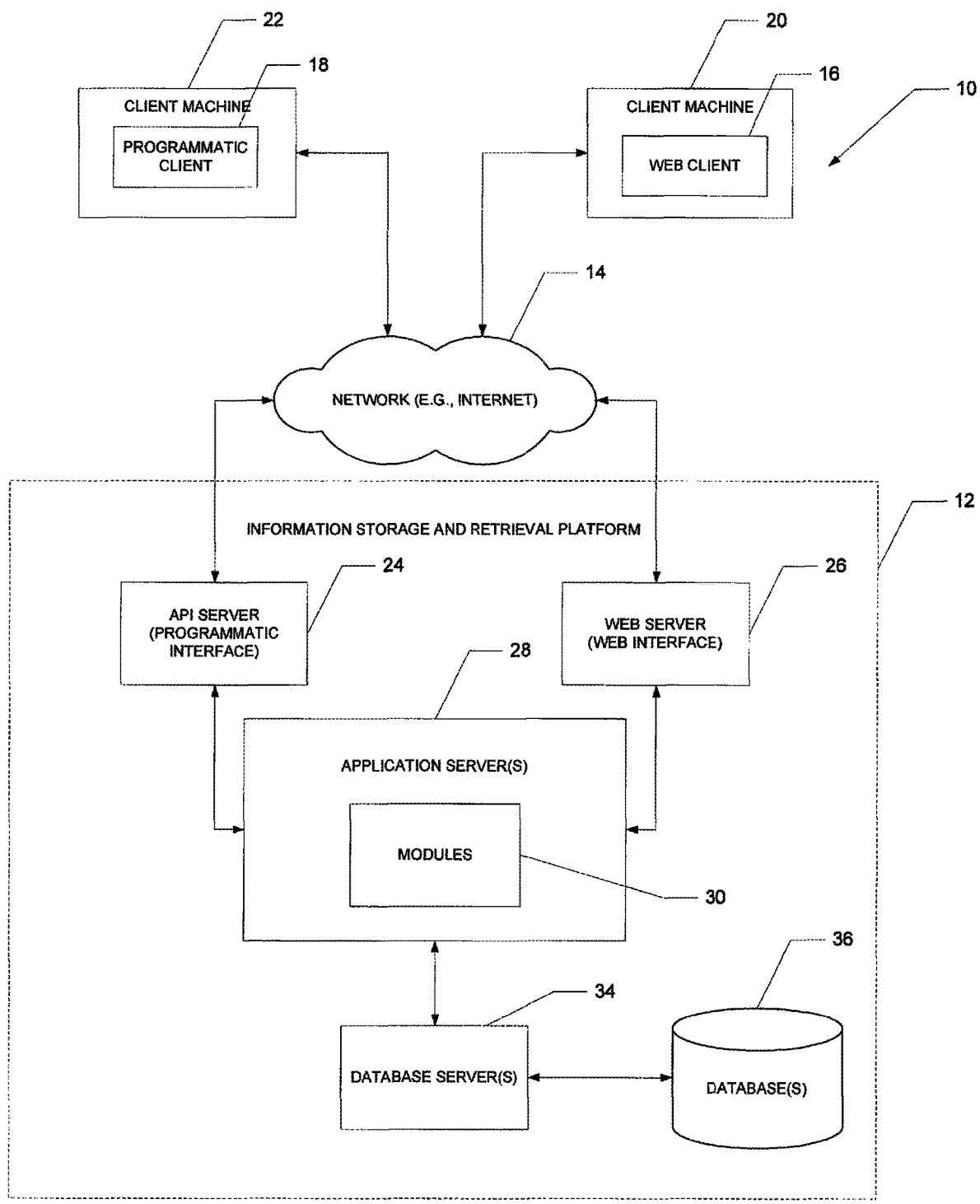
FIG. 4 is a network diagram depicting a system, according to one example embodiment, having a client-server architecture.

FIG. 4 is a network diagram depicting a system 10, according to one example embodiment, having a client-server architecture. A commerce platform or commerce server, in the example form of an information storage and retrieval platform 12, provides server-side functionality, via a network 14 (e.g., the Internet) to one or more clients. FIG. 4 illustrates, for example, a web client 16 (e.g., a browser, such as the Internet Explorer browser developed by Microsoft Corporation of Redmond, Wash. State), and a programmatic client 18 executing on respective client machines 20 and 22.

Turning to the information storage and retrieval platform 12, an application program interface (API) server 24 and a web server 26 are coupled to, and provide programmatic and web interfaces respectively to, one or more application servers 28. The application servers 28 host one or more modules 30 (e.g., modules, applications, engines, etc.). The application servers 28 are, in turn, shown to be coupled to one or more database servers 34 that facilitate access to one or more databases 36. The modules 30 provide a number of information storage and retrieval functions and services to users that access the information storage and retrieval platform 12.

While the system 10 shown in FIG. 4 employs a client-server architecture, the present disclosure is of course not limited to such an architecture, and could equally well find application in a distributed, or peer-to-peer, architecture system. The various modules 30 may also be implemented as standalone software programs, which do not necessarily have networking capabilities.

The web client 16 may access the various modules 30 via the web interface supported by the web server 26. Similarly, the programmatic client 18 accesses the various services and functions provided by the modules 30 via the programmatic interface provided by the API server 24. The programmatic client 18 may, for example, be a seller application (e.g., the TurboLister application developed by eBay Inc., of San Jose, Calif.) to enable sellers to author and manage data items or listings on the information storage and retrieval platform 12 in an off-line manner, and to perform batch-mode communications between the programmatic client 18 and the information storage and retrieval platform 12.

Figure 5:
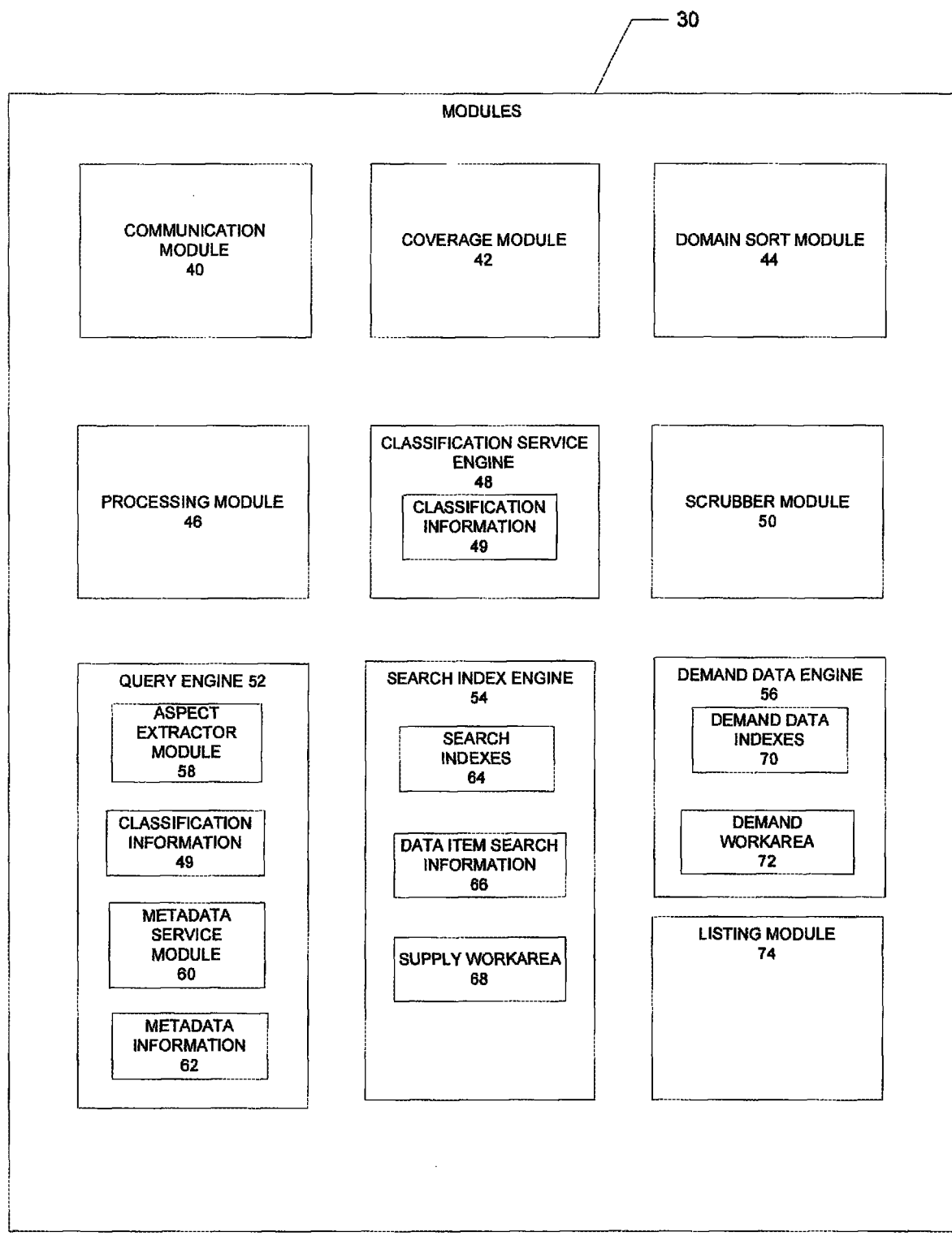
FIG. 5 is a block diagram illustrating modules and engines, according to an embodiment.

FIG. 5 is a block diagram illustrating the modules 30, according to an embodiment. The modules 30 include a communication module 40, a coverage module 42, a domain sort module 44, a processing module 46, a classification service engine 48, a scrubber module 50, a query engine 52, a search index engine 54, a demand data engine 56, and a listing module 74.

The communication module 40 may receive a query from the client machine 22, 20 which may include one or more constraints (e.g., keywords, categories, information specific to a type of data item, otherwise referred to as an item-specific, etc.). The communication module 40 may interact with the query engine 52, the search index engine 54, the demand data engine 56, and the coverage module 42 to process the query. The communication module 40 may receive aspect-value pairs that may be extracted from the query responsive to processing the query. Further, the communication module 40 may construct a transformed query based on the query received from the client machine 20, 22 and may communicate the interface (e.g., user interface) to the user at the client machines 22, 20.

The coverage module 42 may generate a total coverage histogram based on corresponding supply histograms and demand histograms. For example, the coverage module 42 may generate a total coverage histogram associated with product type domains based on a supply histogram and demand histogram both associated with product type domains. The coverage module 42 may generate total coverage histograms for product type domains, aisle type domains and department type domains. In addition, the coverage module 42 may generate interface information by comparing distributions of the total coverage information with the predetermined peak, hills, and flat distributions 2, 4 and 6.

The domain sort module 44 may generate distribution data that may determine the position (e.g., order) of interface elements (e.g., user interface elements, audio interface elements, media interface elements, machine interface elements) that represent domains for presentation on an interface (e.g., user interface, audio interface, media interface, machine interface) that includes multiple domains (e.g., cross-domain user interface). For example, the domains of greatest interest to the user may be represented at the most prominent positions on a cross-domain user interface with user interface elements.

The processing module 46 may receive classification information and metadata information that may be authored with a classification and metadata tool. The processing module 46 may publish the classification information and metadata information to backend servers that may host the query engine 52, the search index engine 54, and the classification service engine 48.

The classification service engine 48 may apply domain rules and aspect rules to data items. The classification service engine 48 may apply domain rules to identify one or more domain-value pairs (e.g., Product Type=Women's Shoes) that may be associated with the data item. The classification service engine 48 may further apply the aspect rules to identify aspect-value pairs (Brand=Anne Klein) that may be associated with the data item. The classification service engine 48 may apply the domain and aspect rules to data items or listings as they are added to the information storage and retrieval platform 12, or responsive to the publication of new rules (e.g., domain rules, aspect rules).

The scrubber module 50 may process data items responsive to the information storage and retrieval platform 12 receiving the data items from the client machines 20, 22. For example, the scrubber module 50 may use the services of the classification service engine 48, as previously described, to apply domain rules and aspect rules to the data item. The scrubber module 50 may further store the data item, with the associated domain-value pairs and aspect-value pairs in a database 36 as item search information. Further, the scrubber module 50 pushes or publishes item search information over a bus in real time to the search index engine 54.

The query engine 52 includes an aspect extractor module 58, classification information 49, metadata service module 60, and metadata information 62. The aspect extractor module 58 may receive a query from the communication module 40 and apply aspect rules to extract aspect-value pairs from the query. The aspect extractor module 58 may further communicate the aspect-value pairs to the communication module 40.

The metadata service module 60 may communicate metadata information to the communication module 40 based on the query that is received from the communication module 40. The metadata information may include metadata that the communication module 40 may use to format and generate the interface (e.g., user interface).

The search index engine 54 may include search indexes 64, data item search information 66 (e.g., including data items and associated domain-value pairs and aspect-value pairs), and a supply work area 68. The search index engine 54 may receive the transformed query from the communication module 40 and utilize the search indexes 64 to identify data items based on the transformed query. The search index engine 54 may further communicate the found data items to the communication module 40. The search index engine 54 is also shown to include a supply work area 68 that may be used to generate histograms based on the data item search information 66 associated with the found data items.

The demand data engine 56 includes demand data indexes 70 and a demand work area 72. The demand data engine 56 may receive a pretransformed query from the communication module 40 and use the pretransformed query to search the demand data indexes 70 to identify navigation data that may be associated with previously received queries with constraints that correspond to the constraints of the pretransformed query. For example, the navigation data may include a selection of a user interface that may be associated with a domain (e.g., product type=shoes) that preceded a selection of a data item thereby suggesting a preferred domain to view the data item. The demand data engine 56 may further generate demand histograms based on the navigation data.

The listing module 74 may receive information from a client machine 20 or 22 and store the information as a data item in the database 36.

Figure 6:
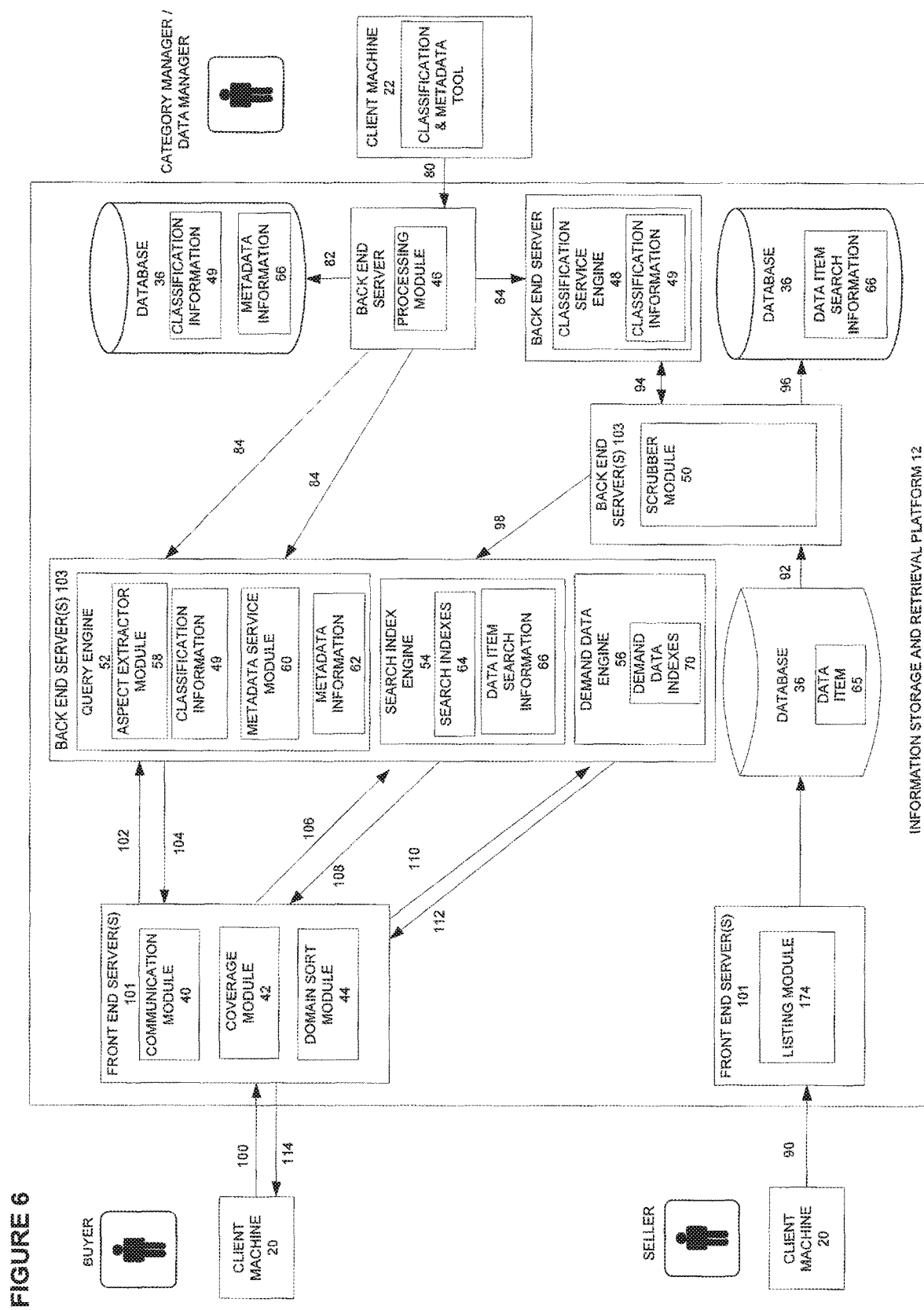
FIG. 6 is a block diagram illustrating an information storage and retrieval platform, according to an embodiment.

FIG. 6 is a block diagram further illustrating the information storage and retrieval platform 12, according to an embodiment. For example, the information storage and retrieval platform 12 may be embodied as a network-based marketplace (e.g., eBay, the Worlds Online Marketplace developed by eBay Inc., of San Jose, Calif.) that supports the transaction of data items or listings (e.g., goods or services) between sellers and buyers. In one embodiment, the information storage and retrieval platform 12 may receive information from sellers that describe the data items that may subsequently be retrieved by potential buyers or bidders.

Rules Generation

At operation 80, a category or data manager may utilize a classification and metadata tool to author rules that may include classification rules (e.g., domain rules and aspect rules) and metadata rules that may be received by a processing module 46 on the information storage and retrieval platform 12.

At operation 82, the processing module 46 may store the rules in the database 36 in the form of classification information and metadata information.

At operation 84, the processing module 46 may publish the rules over a bus to a query engine 53, a metadata service module 60, and a classification service engine 48. For example, the processing module 46 may publish the rules in real-time to facilitate the addition of new rules or the modification of existing rules while the information storage and retrieval platform 12 may be operating. In one embodiment, the processing module 46, query engine 52, metadata service module 60 and classification service engine 48 may communicate with each other over a bus that utilizes publish/subscribe middleware and database access software. In one embodiment the middleware may be embodied as TIBCO RENDEZVOUS™, a middleware or Enterprise Application Integration (EAI) product developed by Tibco Software, Inc. Palo Alto, Calif.

Data Item Generation

At operation 90, an author or publisher (e.g., a seller, user, etc.) enters information including item information into a client machine 20. The client machine 20 may communicate the item information to the information storage and retrieval platform 12 where the item information may be stored as a data item 65 in the database 36. The item information entered by the user may include keywords in a title/description, one or more categories in which to list the data item 65, and one or more item-specifics (e.g., color=blue).

At operation 92, a scrubber module 50 may read the data item 65 and utilize the services of the classification service engine 48 (operation 94). The classification service engine 48 may apply domain specific rules to the data item 65 to identify one or more domains (e.g., product type, aisle, department, etc.) and aspect-value pairs (e.g., Brand=Nike). For example, the classification service engine 48 may utilize a rule that includes a condition clause and a predicate clause. The classification service engine 48 may apply the condition clause to the data item 65 (e.g., Title, description, category, item-specific, etc.) and if the condition evaluates TRUE, then the corresponding predicate clause may be associated with the data item 65. For example, a seller may enter a data item 65 that includes Category="Women's Shoes", Title="AK Size 8 Black Pumps" and the classification service engine 48 may apply the rules to the data item 65 to identify one or more applicable domains that may be respectively stored as one or more domain-value pairs with the data item 65 (e.g., if category="Women's Shoes" then product type=Shoes, aisle=shoes, department=apparel). Further, the classification service engine 48 may apply rules to identify one or more aspect-value pairs that may be associated with the data item 65 (e.g., If Title=black then color=black, etc.) as data item search information 66. The classification service engine 48 may, in an example embodiment, assign only canonical values to the value of an aspect-value pair. For example, the seller may enter any of the following strings "A Klein", "Anne Klein" and "AK"; however, in each case, the classification service engine 48 may associate an aspect-value pair with the same canonical value, Brand="Anne Klein."

At operation 96, the scrubber module 50 may store the data item 65, domain value-pairs, and aspect-value pairs as data item search information 66 in the database 36.

At operation 98 the scrubber module 50 pushes or publishes the data item search information 66 over a bus in real time to a search index engine 54 that may store the data item search information 66 and update search indexes 64 based on the data item search information 66. For example, the search index engine 54 may add a data item identification number to appropriate search indexes 64 that may be associated with keyword(s) or aspect-value pairs in the data item 65. The scrubber module 50 and search index engine 54 may communicate with each other over a bus that utilizes publish/subscribe middleware and database access software. In one embodiment the middleware may be embodied as TIBCO RENDEZVOUS™, as described above.

Query Time Operations

At operation 100, a user may enter a query that includes different types of constraints including a keyword constraint, an item-specific constraint, and a category constraint. The query may be received by a communication module 40 at the information storage and retrieval platform 12.

At operation 102, the communication module 40 may communicate the query to the query engine 52, at a back end server 103 that may include the aspect extractor module 58 and the metadata service module 60. The aspect extractor module 58 may apply the aspect rules to the query to extract aspect-values from the query that may be associated with a product type. For example, the query "A Klein shoes size 8 black" may correspond to the aspect-value pairs color=black, brand=anne klein, size=8 IN product type=shoes. Further, the aspect extractor module 58 may assign the same canonical values that were assigned by the classification service engine 48, as described below. Indeed, the aspect extractor module 58 may utilize a sub-set of the same aspect rules that were utilized by the classification service engine 48.

At operation 104, the aspect extractor module 58 may communicate the extracted aspect-value pairs to the communication module 40. Further, the metadata service module 60 may communicate metadata information 62 to the communication module 40. The communication module 40 may utilize the extracted aspect-value pairs to construct a transformed query. For example, the transformed query may include keywords from the query and aspect-value pairs extracted from the query. In addition, the communication module 40 may cache the metadata for subsequent construction of the interface (e.g. user interface).

At operation 106, the communication module 40 communicates the transformed query to the search index engine 54 at the back end server 103. The search index engine 54 may utilize the transformed query to retrieve data items 65 which may subsequently be utilized by the search index engine 54 to generate supply histograms. The search index engine 54 retrieves the data items 65 by utilizing the search indexes 64. For example, the search index engine 54 may utilize the keywords constraints (e.g., keywords) in the transformed query to retrieve item identification numbers from search indexes 64 that correspond to the keywords. Further, the search index engine 54 may utilize the aspect-value pairs in the transformed query to retrieve item identification numbers from search indexes 64 that correspond to the aspect-value pairs.

The search index engine 54 may utilize the retrieved data items 65 to generate supply histograms associated with products, aisles and departments. The supply histogram may include multiple entries of supply information, for example in the form of a percent supply coverage that may be associated with each domain.

At operation 108, the search index engine 54 may communicate the retrieved data items 65 and the supply histograms to the communication module 40.

At operation 110, the communication module 40 communicates the original (e.g., pretransformed) query to the demand data engine 56. The demand data engine 56 utilizes the pretransformed query to generate a demand side product histogram, a demand side aisle histogram, and a demand side department histogram by utilizing navigation information that is historical (e.g., a database of network events that describe recorded user activity).

At operation 112, the demand data engine 56 may communicate the demand histograms to a coverage module 42 on a front end server 101. The coverage module 42 may generate total coverage histograms based on corresponding supply histograms and demand histograms. For example, in one embodiment, the percent supply coverage associated with each domain in a supply histogram may be respectively added to the percent demand coverage associated with each domain in a demand histogram and the respective results may be divided by two (e.g., an average) to yield a total coverage histogram. Other embodiments may use different operations to combine the supply information and demand information.

Next, the coverage module 42 may utilize the total coverage histograms to generate interface information that may determine the type of user interface to present to the user. For example, if the total coverage histogram associated with products match the predetermined peak distribution 2 then the coverage module 42 may generate product user interface information (e.g., one product) where the product is selected based on the position of the peak. On the other hand, if the total coverage histogram associated with products indicates multiple hills, then the coverage module 42 may generate cross-product user interface information (e.g., multiple products) where the multiple products may be identified based on the position of the hills. Finally, if the total coverage histogram associated with products is flat, then the coverage module 42 may bubble up to the total coverage histogram associated with aisles to determine the interface information to generate. If the total coverage histogram associated with aisles is flat, then the coverage module 42 may utilize the total coverage histogram associated with departments to determine the interface information to generate (e.g., single department or multiple departments).

Finally, if a cross-domain display (e.g., multiple products, aisles, or departments) has been selected, then a domain sort module 44 may generate domain distribution data that may determine the order of the domains for presentation on the display where the domains of greatest interest to the user may be presented in the most prominent positions. For example, in one embodiment the domain sort module 44 may use a total coverage department histogram to display departments in descending order (e.g., sorted from highest to lowest percent total coverage) until a first predetermined threshold (maximum cumulative coverage—eighty percent) is reached or until a second predetermined threshold (maximum number of domains—ten) is reached.

At operation 114, the communication module 40 may communicate the interface (e.g., user interface) and the found data items 65 to the client machine 20 where they are displayed to the user (e.g. buyer or bidder).

Figures 7, 8:
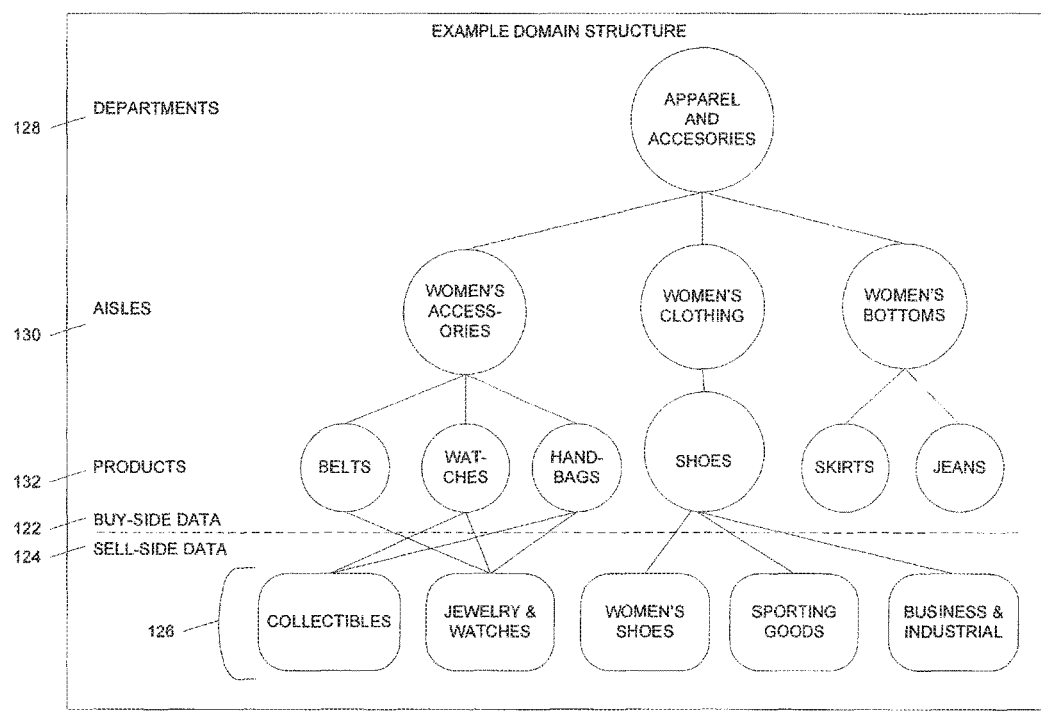
FIG. 7 is a diagram illustrating a domain structure, according to one embodiment.
FIG. 8 is a table illustrating sell-side data and buy-side data, according to one embodiment.

FIG. 7 is a diagram illustrating a domain structure 120, according to one embodiment. The domain structure 120 is shown to include buy-side data 122 and sell-side data 124. The sell-side data 124 is shown to include categories 126 that have been selected by an author of the data item 65 to categorize the data item 65 on the information storage and retrieval platform 12. For example, the author may have selected one or more categories 126 that may include collectibles, jewelry and watches, etc. The buy-side data 122 is shown to include product domains 132 (e.g., Belts, Watches, Handbags, etc.), aisle domains 130 (e.g., Women's Accessories, Women's Clothing, Women's Bottoms, etc.) and a department domain 128 (e.g., Apparel and Accessories). The previously described rules may be used to associate sell side data 124 to the product, aisle and department domains 132, 130, 128. Further, the domains 132 130, 128 may appear on interfaces (e.g., user interfaces) and communicated to the client machines 20, 22 to enable a user to identify or browse the data items 65.

FIG. 8 is a table 148 further illustrating sell-side data 150 and buy-side data 152, according to one embodiment. The sell-side data 150 may be entered by an author or publisher of a listing or data item 65 and stored in the data item 65 and, as described above. The sell-side data 150 may include a category 154, a title 156 and one or more item-specifics 158, 160. For example, the sell-side data 150 illustrates an author or publisher to have entered the category 154 "Women's Shoes", the title 156 "AK Size 8 Black Pumps", the item-specific 158 "Brand=Via Spiga" and the item-specific 160 Size=8. The buy-side data 152 may be associated with the sell side data 150 via the rules, as previously described. Specifically, the condition clause in the rules may be used to test sell-side data 150. If the rule evaluates TRUE then buy-side data 152 in the same column may be associated with the data item 65. For example, the buy-side data 152 is shown to include a product domain-value pair 201 (e.g., product type=Women's Shoes), an aisle domain-value pair 201 (e.g., aisle type=Women's Clothing), a department domain-value pair (e.g., department type=Apparel & Accessories) that were associated with the data item 65 based on the category 154 "Women's Shoes." Note that multiple aspect brands 164 may be associated with the data item 65 based on the title 156 and the item-specific 158.

Figure 9:
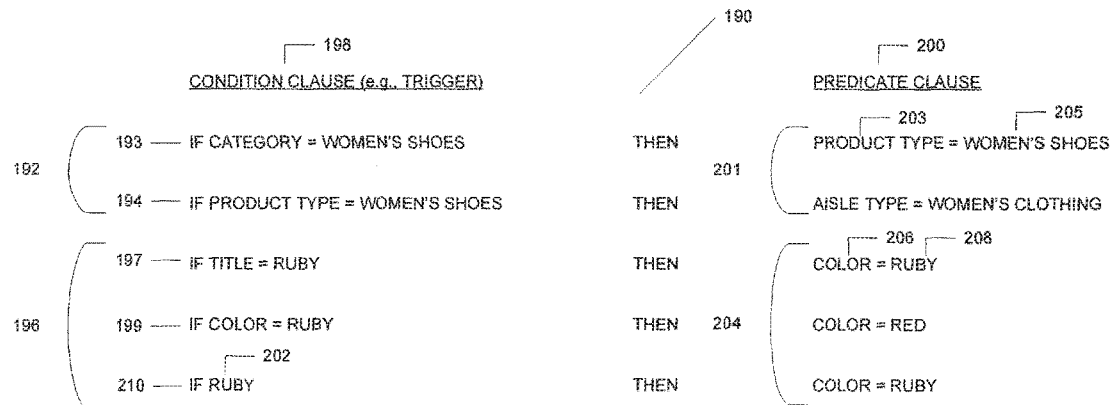
FIG. 9 is a diagram illustrating rules, according to an embodiment.

FIG. 9 is a diagram illustrating rules 190, according to an embodiment. The rules 190 include domain rules 192 and aspect rules 196. The domain rules 192 and aspect rules 196 include a condition clause 198 (e.g., trigger, Boolean expression, etc.) and a predicate clause 200. The condition clause 198 may include a Boolean expression that may evaluate TRUE or FALSE. In one embodiment the Boolean expression may be used to evaluate multiple fields in the data item 65. For example, a Boolean may be used to evaluate the category 154, the title, 156, and an item-specific 158 in a data item 65. Further, the Boolean expression may include multiple operators (AND, OR, EXCLUSIVE OR, etc.). If the condition clause 198 evaluates TRUE, then, the predicate clause 200 may be associated with the data item 65.

The predicate clauses 200 associated with the domain rules 192 may include a domain-value pair 201 (e.g., product type=Women's Shoes). The domain-value pair 201 may include a domain type 203 and a domain 205. The domain type 203 may describe the type of domain such as "Product Type", "Aisle Type", "Department Type", etc. The domain 205 may describe the domain and may be limited to the corresponding domain type 203 such as "Women's Shoes."

The domain-value pair 201 "product type=Women's Shoes" may further be used as a condition clause 198 to trigger the association of another domain-value pair 201. For example, the domain rule 194 is shown to evaluate TRUE if the data item 65 includes the previously associated domain-value pair 201 "Product Type=Women's Shoes." If TRUE, then the domain-value pair 201 "aisle type=Women's Clothing" may also be associated with the data item 65. Accordingly, the association of one domain-value pair 201 to a data item 65 may trigger the association of another domain-value pair 201. For example, a first domain rule 194 may be used to associate a product domain 132 for Women's Shoes to an aisle domain 130 for Women's Clothing and a second domain rule 194 may be used to associate the aisle domain 130 for Women's Clothing to a department domain 128 for Apparel and Accessories.

The predicate clauses 200 associated with the aspect rules 196 may include an aspect-value pair 204 (e.g., color=ruby). For example, the aspect rule 197 is shown associate the aspect-value pair 204 "color=ruby" to the data item 65 based on the condition clause 198, "if Title=Ruby." The aspect-value pair 204 may include an aspect 206 such as "color" and a value 208 such as "ruby." The aspect-value pair 204 (e.g., color=ruby) may be further used as a condition clause 198. For example, an aspect rule 199 may include the aspect-value pair 204 (e.g., color=ruby) to trigger the association of another aspect-value pair 204 ("color=red") to the data item 65. Accordingly, the association of one aspect-value pair 204 to a data item 65 may be used to associate another aspect-value pair 204 to the data item 65. In addition, the aspect rules 196 may include a condition clause 198 that includes a keyword 202. For example, an aspect rule 196 is shown to include the keyword 202 "ruby." The keyword(s) 202 in the condition clause 198 may be used by the aspect extractor module 58 to associate keyword(s) 202 in a query that is received from the client machine 20 to aspect-value pairs 204.

Figure 10:
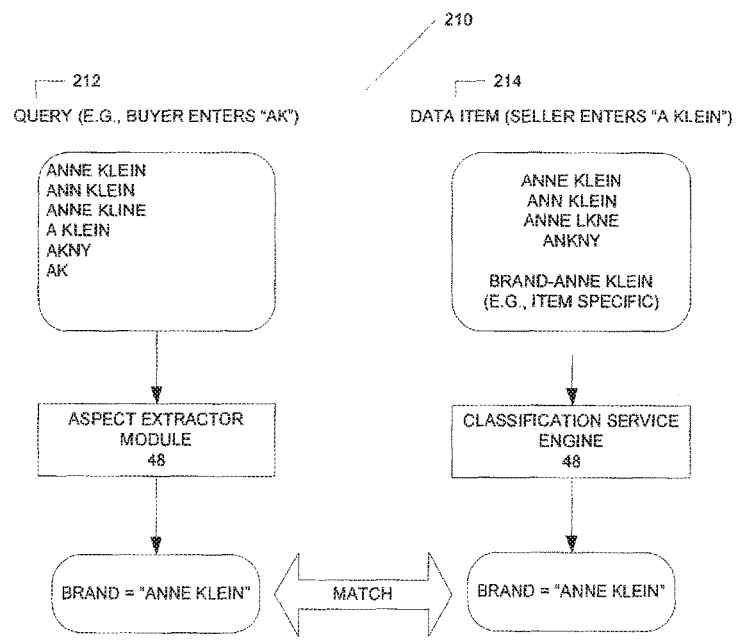
FIG. 10 is a diagram illustrating a canonical matching concept, according to an embodiment.

FIG. 10 is a diagram illustrating a canonical matching concept 210, according to an embodiment. The canonical matching concept 210 may be used to identify a data item 65 with a query 212. The canonical matching concept 210 may use a value 208 that is canonical to represent other values 208. For example, the query 212 may be received from a client machine 20, 22 including the string, "AK." The query 212 may be processed with an aspect rule 196 that may include a condition clause 198 that includes multiple keywords 202 (If "Anne Klein" OR "Ann Klein" OR "A Klein" OR "AKNY" OR "AK", etc.) to associate the canonical aspect-value pair 204 "Brand="Anne Klein" to the query 212.

Continuing with example, a data item 65 may be received from a seller at the client machine 20, 22 and may include any of the illustrated strings that represent "Ann Klein." For example, the title in the data item 65 may contain "Anne Klein." Continuing with the example, the data item 65 may be processed with an aspect rule 196 that includes a condition clause 198 that includes multiple keywords 202 (If title="Anne Klein" OR "Ann Klein" OR "A Klein" OR "AKNY" OR "AK", etc.) to associate the canonical aspect-value pair 204 "brand="Anne Klein" to the data item 65.

Figure 11:
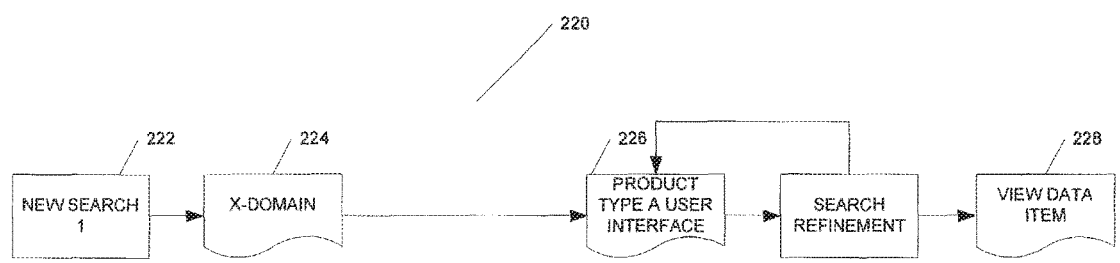
FIG. 11 is a diagram illustrating a set of requests, according to one embodiment, that may cause the storage of navigation information.

FIG. 11 is a diagram illustrating a set of requests 220, according to one embodiment. The set of requests 220 may cause the demand data engine 56 to store navigation information in the demand data indexes 70. The set of requests 220 may originate at the client machines 20, 22 and may be received by the demand data engine 56 at the information storage and retrieval platform 12 that may register the occurrence of the set of requests 220. The set of requests 220 may include a query that may include one or more constraints (e.g., keywords, categories, item-specifics, etc.), a request to view a domain (e.g., product domain 166, aisle domain 168 or department domain 178) that may be received by the demand data engine 56 prior to receiving a request to view a data item, and the request to view the data item 65. For example, at operation 222, the demand data engine 56 may receive navigation information in the form of a query (e.g., "iPod"). At operation 224, the demand data engine 56 may receive a request to view a cross domain page (e.g., including multiple product types). At operation 226, the demand data engine 56 may receive a request to view the product domain 132 "Portable Audio." At operation 228, the demand data engine 56 may receive a request to view a data item 65. Responsive to receiving the request to view the data item 65, the demand data engine 56 may register the request to view the data item 65 in the demand data indexes 70 (e.g., increment a view data item count) corresponding to the query "iPod" and corresponding to the product domain 132 "Portable Audio".

Figure 12:
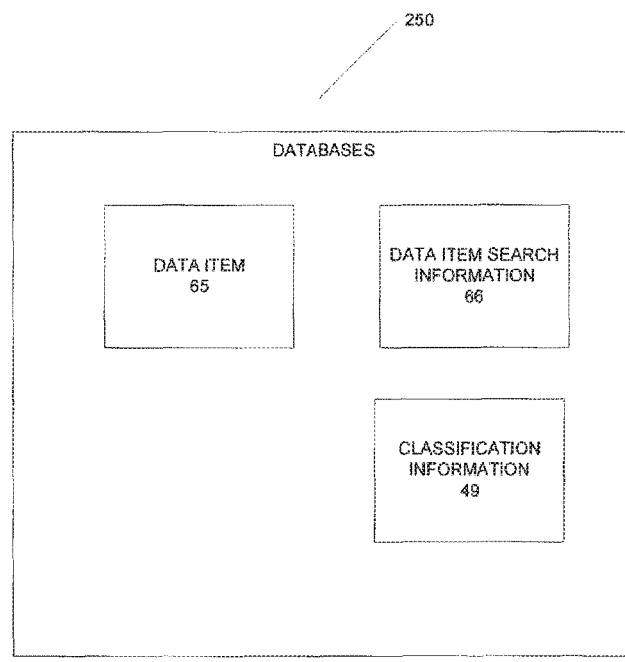
FIG. 12 is a block diagram illustrating databases, according to an embodiment.

FIG. 12 is a block diagram illustrating databases 250, according to an embodiment. The databases 250 may include the data item 65, the classification information 49 and the data item search information 256. The data item 65 may include information from the author of a listing or data item 65 as entered from the client machine 22, 20. The data item search information 66 includes the data item 65, and domain-value pairs 201 and aspect-value pairs 204 that have been associated with the data item 65. The classification information 49 includes rules that may be applied to queries and data items 65.

Figure 13:
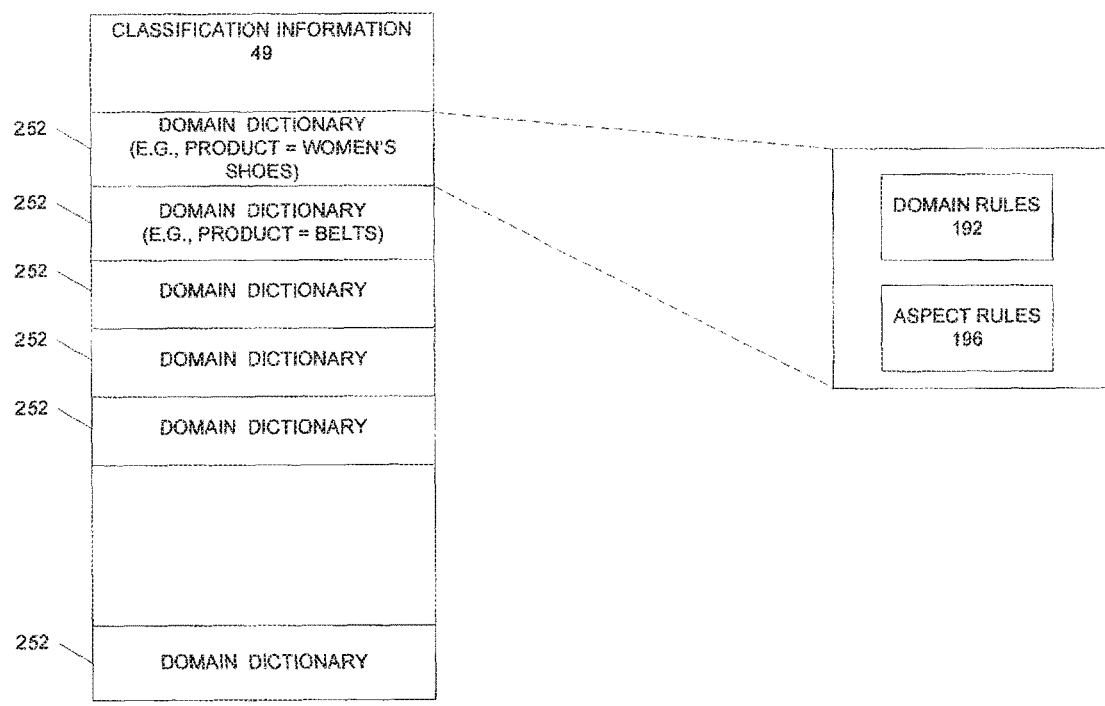
FIG. 13 is a block diagram illustrating classification information, according to an embodiment.

FIG. 13 is a block diagram illustrating the classification information 49, according to an embodiment. The classification information 49 may include multiple domain dictionaries 252, each associated with a product type domain. Each domain dictionary 252 may include domain rules 192 and aspect rules 196. The domain rules 192, as previously described, may be used to associate a specific product type domain and/or aisle domain and/or department domain to the data items 65. The aspect rules 196 may be used to associate aspect-value pairs 204 to the data items 65 that may be associated with the product type domain corresponding to the domain dictionary 252.

Figure 14:
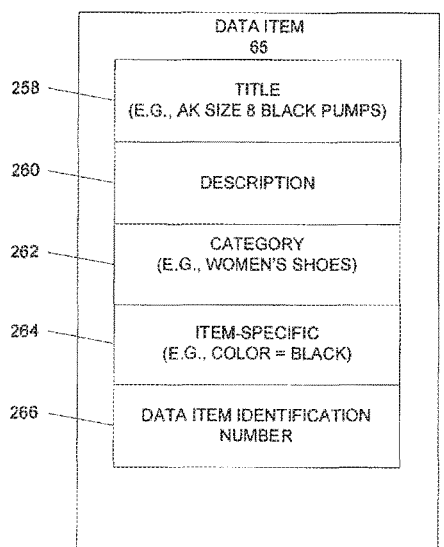
FIG. 14 is a block diagram illustrating a data item, according to an embodiment.

FIG. 14 is a block diagram illustrating the data item 65, according to an embodiment. The data item 65 may include a title 258, a description 260, one or more categories 262, one or more item-specifics 264, and a data item identification number 266. The title 258 may include keywords entered by the user to describe the data item 65. For example, the present data item 65, as illustrated, shows a title "AK Size 8 Black Pumps." The description 260 may be used to describe the data item 65 that may be for sale or auction. The category 262 may be a category selected by the seller or author or publisher of the data item 65. The item-specific 264 may include item-specific information that may be associated with the data item 65. In the present example, the data item 65 may be a pair of shoes, and therefore an item-specific 264 for color is appropriate. The data item identification number 266 uniquely identifies the data item 65 in the information storage and retrieval platform 12.

Figure 15:
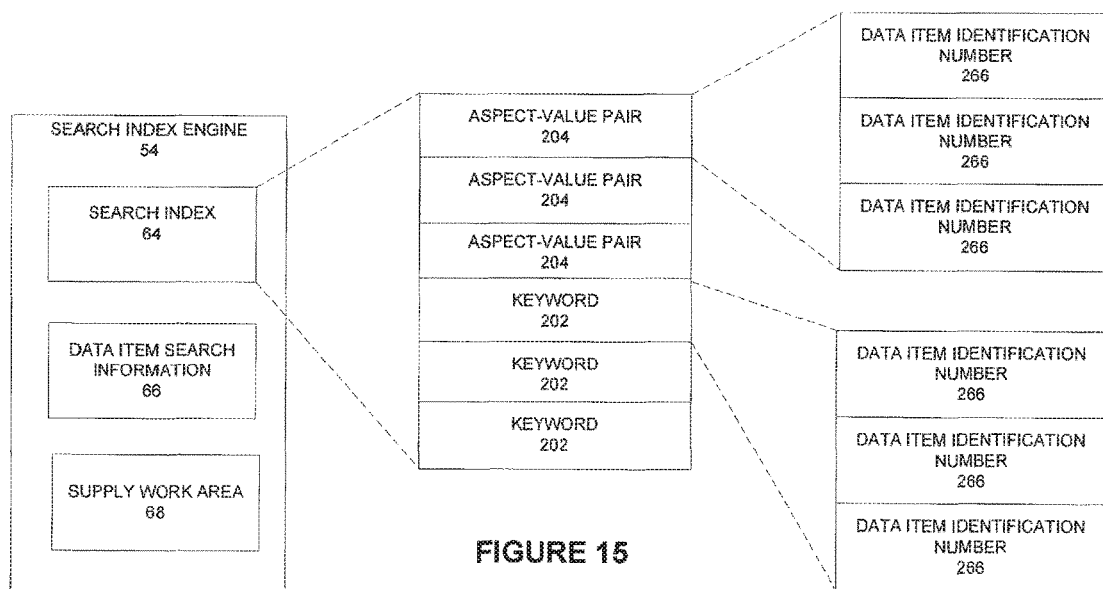
FIG. 15 is a block diagram illustrating a search index engine, according to an embodiment.

FIG. 15 is a block diagram illustrating the search index engine 54, according to an embodiment. The search index engine 54 is shown to include the search index 64, the data item search information 66, and supply work area 68. The search index 64 is further shown to include multiple aspect-value pairs 204 and multiple keywords 202. Each aspect-value pair 204 and keyword 202 is further illustrated as associated with one or more data item identification numbers 266. For example, if a data item 65 was associated with the aspect-value pair 204 "Brand=Anne Klein", then the data item identification number 266 corresponding to the data item 65 may be associated with the aspect-value pair "Brand=Anne Klein." Also, for example, if a data item 65 was associated with the aspect-value pair 204 "Color=Ruby", then the aspect rule 196 "If title=Ruby then Color=Ruby" then the data item identification number 266 corresponding to the data item 65 may be associated with the keyword 202 "Ruby" in the search index 64.

Figure 16:
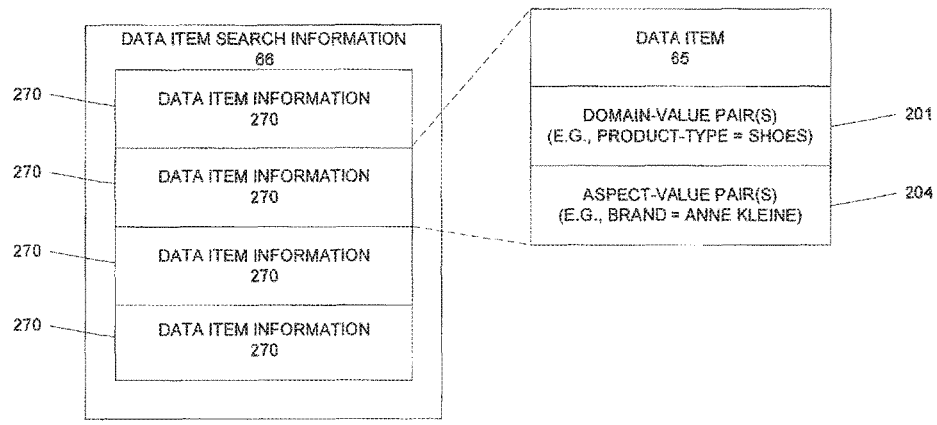
FIG. 16 is a block diagram illustrating a data item search information.

FIG. 16 is a block diagram illustrating the data item search information 66. The data item search information 66 is shown to include multiple data item information 270 entries. Each data item information 270 entry may be associated with a data item 65, one or more domain-value pairs 201 and one or more aspect-value pairs 204.

Figure 17:
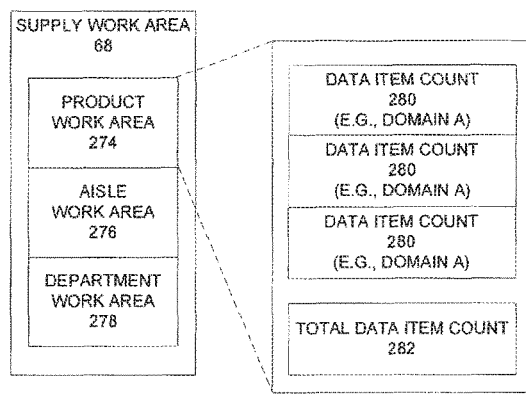
FIG. 17 is a block diagram illustrating a supply work area, according to an embodiment.

FIG. 17 is a block diagram illustrating the supply work area 68, according to an embodiment. The search index engine 54 may utilize the supply work area 68 to build supply histograms. The supply work area 68 is shown to include a product work area 274 that may be used to build the supply histograms for all product domains 132 in the information storage and retrieval platform 12, an aisle work area 276 that may be used to build aisle supply histograms for all aisle domains 130 in the information storage and retrieval platform 12, and a department work area 278 that may be used to build department supply histograms for all department domains 128 in the information storage and retrieval platform 12. Each of the work areas 274, 276, 278 may include data item counts 280 and a total data item count 282, as illustrated with respect to the product work area 274. The data item count 280 may represent the number of data items 65 found that may be associated with the corresponding domain 205. The data item count 280 may be used by the search index engine 54 to count the number of found data items 65 that may be associated with the respective product type, aisle type or department type domains 205. The search index engine 54 may sum or accumulate data item counts 280 in the supply work area 68 (e.g., product work area 274, aisle work area 276, department work area 278) to generate the total data item counts 282 for the respective work areas 274, 276, 278.

Figure 18:
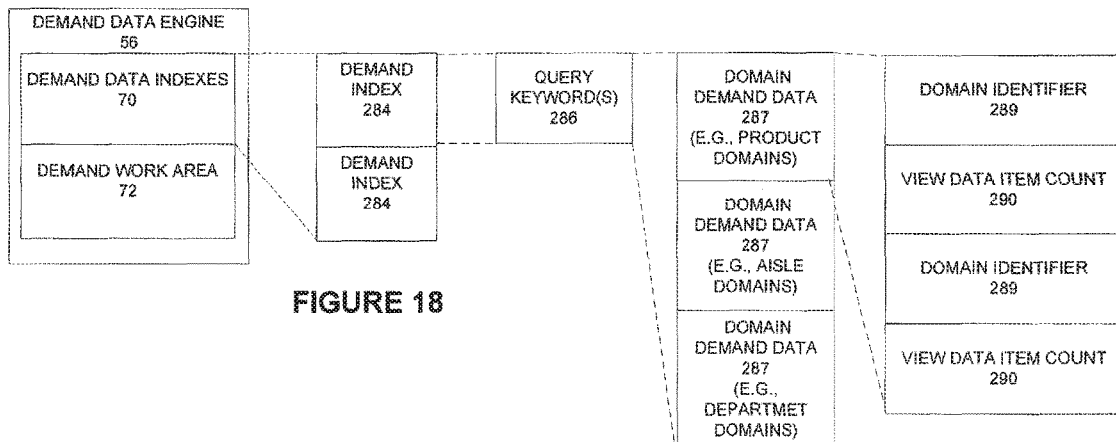
FIG. 18 is a block diagram illustrating demand data indexes, according to an embodiment.

FIG. 18 is a block diagram illustrating the demand data indexes 70, according to an embodiment. The demand data indexes 70 may be used to store navigation information and may include multiple demand indexes 284. Each demand index 284 is shown to include a second query in the form of query keyword(s) 286. The query keywords 286 may be matched against the keywords contained in a query as received from the client machine 20, 22. Each query keyword(s) 286 entry may be associated with multiple domain demand data 287 entries. Each domain demand data 287 entry may be associated with a domain type (e.g., product domain 132, aisle domain 130, and department domain 128) that supports entries for all domains 205 associated with the domain type. Each entry within the domain demand data 287 includes a domain identifier 289, and a view data item count 290. The appropriate view data item count 290 may be incremented by the demand data engine 56 responsive to the detection of a set of requests 220 that may include a query that matches the query keywords 286, a request to view the domain 205 (e.g., product domain 166, aisle domain 168 or department domain 178), and a request to view a data item 65. The specific view data item count 290 that may be incremented corresponds to the domain 205 associated with the request to view the domain that preceded the request to view the data item 65. Further, the view data item count 290 may be collected over a standard period of time (e.g., seven days, one month, etc.).

Figure 19:
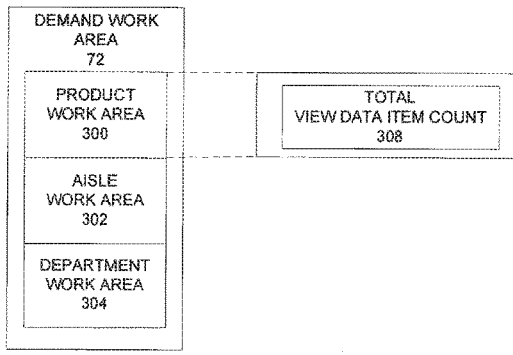
FIG. 19 is a block diagram illustrating the demand work area, according to an embodiment.

FIG. 19 is a block diagram illustrating the demand work area 72, according to an embodiment. The demand data engine 56 may utilize the demand work area 72 to build demand histograms. The demand work area 72 is shown to include a product work area 300 that may be used to build demand histograms for all product domains 132 in the information storage and retrieval platform 12, an aisle work area 302 that may be used to build aisle demand histograms for all aisle domains 130 in the information storage and retrieval platform 12, and a department work area 304 that may be used to build department demand histograms for all department domains 128 in the information storage and retrieval platform 12. Each of the work areas 300, 302, 304 may include a total view data item count 308, as illustrated with respect to the product work area 300. The view data item counts 290 in the domain demand data 287 (e.g., product domains or aisle domains or department domains) may be used by the demand data engine 56 to generate the total view data item counts 308 that may be associated with the respective product type, aisle type or department type domains 205. For example, the demand data engine 56 may sum or accumulate all of the view data item counts 290 within a domain demand area 287 (e.g., product domains or aisle domains or department domains) to generate the total view data item counts 308 for the respective work areas 300, 302, 304. Further, the total view data item count 308 may be used to generate demand information in the form of a percent demand coverage that may be stored in a demand histogram according to domain 205 (e.g., view data item count 290/total view data item count 308).

Histograms

Figure 20:
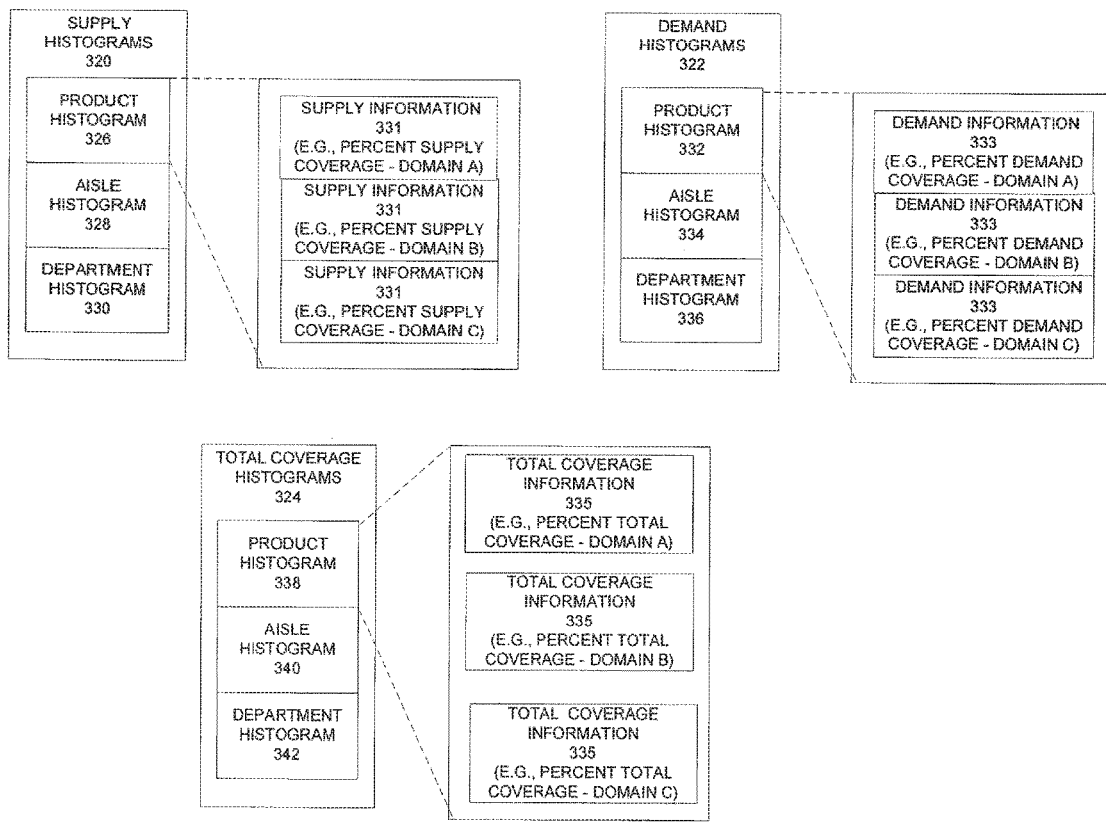
FIG. 20 is a block diagram illustrating supply histograms, demand histograms and total coverage histograms.

FIG. 20 is a block diagram illustrating supply histograms 320, demand histograms 322 and total coverage histograms 324.

Supply Histograms

The supply histograms 320 may include a first distribution in the form of a product histogram 326, an aisle histogram 328 or a department histogram 330. For example, the product histogram 326 may include the supply information 331 (e.g., percent supply coverage) distributed across the product domains 132 in the information storage and retrieval platform 12. The aisle histogram 328 may include supply information 331 (e.g., percent supply coverage) distributed across the aisle domains 130 in the information storage and retrieval platform 12. The department histogram 330 may include the supply information 331 (e.g., percent supply coverage) distributed across the department domains 128 in the information storage and retrieval platform 12.

Demand Histograms

The demand histograms 322 may include a second distribution in the form of a product histogram 332, an aisle histogram 334, or a department histogram 336. The product histogram 332 may include demand information 333 (e.g., percent demand coverage) distributed across the product domains 132 in the information storage and retrieval platform 12. The aisle histogram 334 may include the demand information 333 (e.g., percent demand coverage) distributed across the aisle domains 130 in the information storage and retrieval platform 12. The department histogram 336 may include the demand information 333 (e.g., percent demand coverage) distributed across the domains 128 in the information storage and retrieval platform 12. In one embodiment the demand information 333 associated with a domain may be calculated only if supply information 331 (e.g., non-zero value) exists for the corresponding domain.

Total Coverage Histograms

The total coverage histograms 324 may include a third distribution in the form of a product histogram 338, an aisle histogram 340 or a department histogram 342. The product histogram 338 includes may include total coverage information 335 (e.g., percent total coverage) distributed across the product domains 132 in the information storage and retrieval platform 12. The aisle histogram 340 may include the total coverage information 335 (e.g., percent total coverage) distributed across the aisle domains 130 in the information storage and retrieval platform 12. The department histogram 336 may include the total coverage information 335 (e.g., percent total coverage) distributed across the department domains 128 in the information storage and retrieval platform 12.

Figure 21:
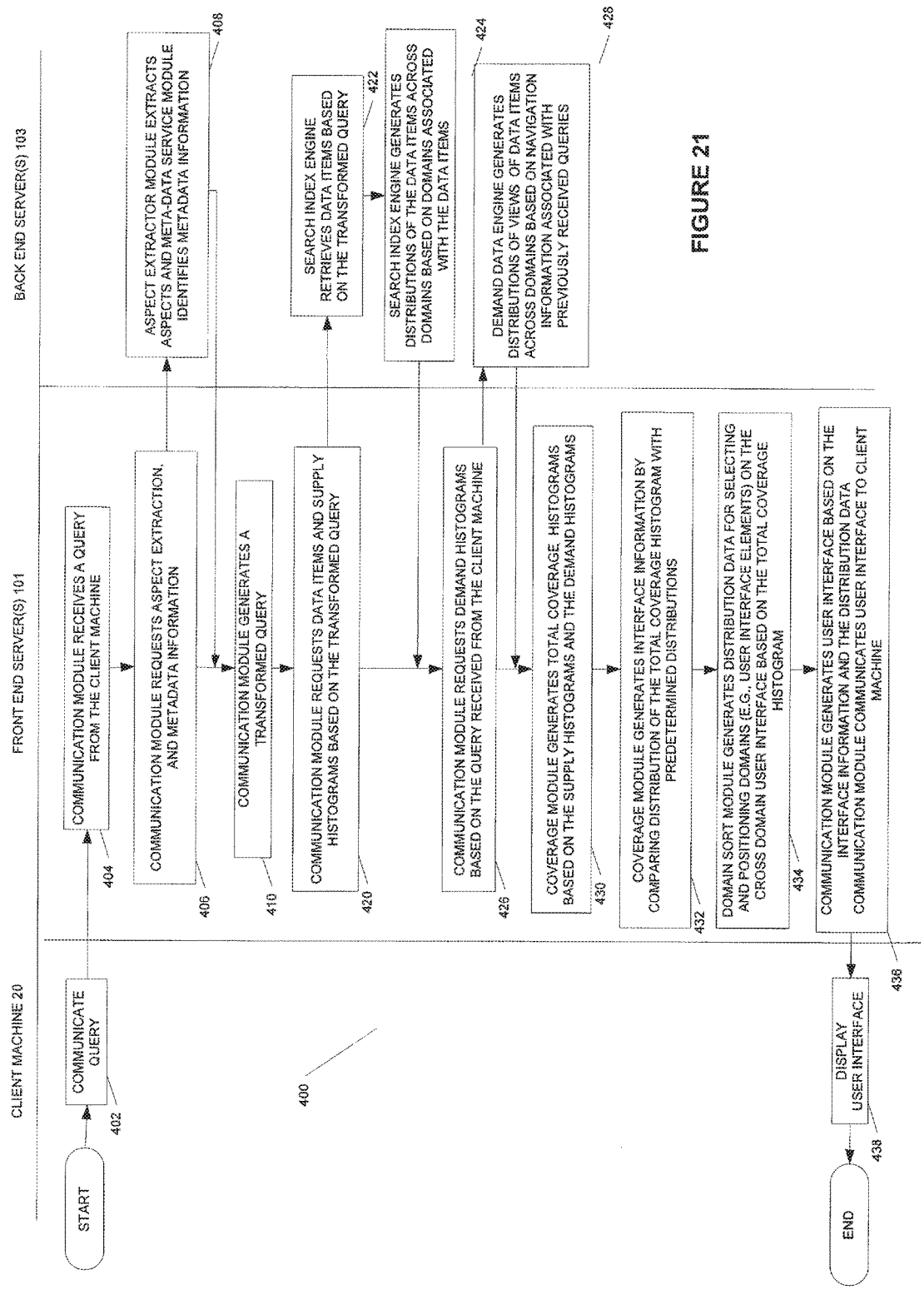
FIG. 21 is a flow chart illustrating a method to communicate information, according to an embodiment.

FIG. 21 is a flow chart illustrating a method 400 to communicate information, according to an embodiment. Illustrated on the left is the client machine 20; illustrated in the middle are operations performed by the front-end servers 101; and illustrated on the right are operations performed by the backend servers 103. The method 400 commences at operation 402 with the web client 16 at the client machine 20 communicating a query that may be entered by a user. The query may contain one or more constraints that may include keyword constraints, category constraints, and item-specific constraints. For example, the user may enter the query with the following keywords 202, "AK shoes ruby."

At operation 404, at the front-end servers 101, the communication module 40 may receive the query from the client machine 20 and at operation 406 the communication module 40 may request aspect extraction and metadata information 62 based on the query.

At operation 408, the aspect extractor module 58 receives the query and extracts aspect-value pairs from the query based on aspect rules 196. For example, the aspect extractor module 58 may extract the aspect-value pairs 204 "Brand=Anne Klein" and "Color=ruby." Note that aspect extractor module 58 has generated canonical aspect-value pairs 204 based on the query "AK shoes ruby." In addition, the metadata service module 60 may identify metadata information 62 based on the query "AK shoes ruby." Finally, the aspect extractor module 58 may communicate the aspect-value pairs 204 "Brand=Anne Klein" and "Color=ruby" to the communication module 40 on the front-end server 101 and the metadata service module 60 may communicate the appropriate metadata information 62 to the communication module 40 on the front-end server 101.

At operation 410, at the front-end server 101, the communication module 40 may generate a transformed query based on the query and extract aspect-value pairs 204. For example, the communication module 40 may generate the transformed query ["AK" AND "shoes" AND "ruby"] OR ["Brand=Anne Klein" AND "Color=ruby"].

At operation 420, the communication module 40 may request data items 65 and supply histograms 320 based on the transformed query by communicating the transformed query to the search index engine 54.

At operation 422, the search index engine 54 may retrieve the data items 65 based on the transformed query. Specifically, the search index engine 54 may search the search indexes 64 based on the aspect-value pairs 204 (e.g., "Brand=Anne Klein" AND "Color=ruby") to identify matching data items 65 (e.g., found data items). Note that a matching data item 65 may include both aspect-value pairs 204 to be considered a match. Further, the search index engine may identify a matching data item based on the keywords in the transformed query (e.g., "AK" AND "shoes" AND "ruby"). Note that a matching data item 65 may be required to include all three keywords 202 to be considered a match.

At operation 424, the search index engine 54 may generate supply histograms 320 (e.g., distributions) based on the found data items 65 using the domains 205 that may be used to identify the data items 65, as described further below. For example, the domains 205 may include the product, aisle and department domains 132, 130, 128 that may be navigated by buyers to find the data items 65. In addition, the search index engine 54 may communicate the distributions and the found data items 65 to the communication module 40 at the front-end server 101.

At operation 426, the communication module 40 may request demand histograms 322 based on the query received from the client machine. For example, the communication module 40 may communicate the query "AK shoes ruby."

At operation 428, the demand data engine 56 may generate demand histograms 322 (e.g., distributions) of requests to view data items 65 across domains based on navigation information associated with the query. For example, the demand data engine 56 may identify a demand index 284 associated with constraints (e.g., query keywords 286 "AK shoes ruby") that correspond to the constraints (e.g., keywords) in the query "AK shoes ruby", as described further below. Responsive to identifying the demand index 284, the demand data engine 56 may add the view item counts 290 associated with a type of domain (e.g., product domains or aisle domains or department domains) and store the sum as the total view item count 308 in the demand work area (e.g., product work area 300, aisle work area 302, department work area 304). Next, the demand data engine 56 may generate demand information 333 (e.g., percent demand coverage) for the product histogram 332, the aisle histogram 334 and the department histogram 336. For example, the demand data engine 56 may generate demand information 333 for a product domain in the product histogram 332 by dividing the view data item count 290 associated with the product domain by the total view data count 308 associated with the product work area 400. Continuing with the example, the demand data engine 56 may store the demand information 333 in the product histogram 332 according to the product domain. Finally, the demand data engine 56 may communicate the demand histograms 322 to the coverage module 42 on the front-end servers 101. In one embodiment the demand information 333 associated with a domain may be calculated only if supply information 331 (e.g., non-zero value) exists for the corresponding domain.

At operation 430, the coverage module 42 may generate total coverage histograms 324 based on the corresponding supply histograms 320 and the corresponding demand histograms 322. In one embodiment, the coverage module 42 may generate an average for each domain 205 in the total coverage histogram 324, as previously described. Other embodiments may generate the total coverage histogram 324 in a different manner. In another embodiment, the coverage module 42 may scale each of the demand information 333 entries (e.g., percent demand coverage) in the demand histograms 322 before generating averages for each domain 205. For example, the percent demand coverage entries in the demand histogram 322 may be scaled by a factor of 1.2 before combining (e.g., averaging) the entries of the supply histogram 320 with the respective entries of the demand histogram 322. Likewise the percent demand coverage entries in the supply histogram 320 may also be scaled. In another embodiment the following equation may be used to generate the total coverage histogram:

Total Coverage Information(X)=Demand Information (X)*[DEMAND WEIGHT]+Supply Information (X)*(1−DEMAND WEIGHT))

For example, the "Total Coverage Information" may include the total coverage information 335 for the domain 205 "X", the "X" may include a specific domain that may be a product domain 132, an aisle domain 130, or a department domain 128; the "Demand Information" may include the demand information 333 for the domain "X"; the "DEMAND WEIGHT" may include a weight between 0 and 1; and the "Supply Information" may include the supply information 331 for the domain "X".

At operation 432, the coverage module 42 generates interface information. The coverage module may generate interface information by comparing the total coverage histograms 324 (e.g., product histogram 338, aisle histogram 340, department histogram 342) with predetermined distributions 2, 4, 6 to determine the type of interface information to generate, as described further below.

At operation 434, the domain sort module 44 may generate distribution data if the coverage module 42 generated interface information for multiple product domains or multiple aisle domains or multiple department domains (e.g., operations 432, method 498). The domain sort module 44 may generate the distribution data that may be utilized for selecting and positioning interface elements (e.g., user interface elements, audio interface elements, media interface elements, machine interface elements) that may represent domains 205 (e.g., product domains) on the interface (e.g., user interface, audio interface, media interface, machine interface) based on the total coverage histograms 324. For example, domain sort module 44 may select and position user interface elements for a cross-domain user interface (e.g., displaying multiple domains based on a hills distribution), as described further below (e.g., method 530).

At operation 436, the communication module 40 may use the interface information and may use the distribution data to generate the interface. For example, the communication module 40 may use product user interface information to generate a product user interface or cross product user interface information to generate a cross product user interface or aisle user interface information to generate an aisle user interface or cross aisle user interface information to generate a cross aisle user interface or department user interface information to generate a department user interface or cross-department user interface information to generate a cross-department user interface. In addition, the communication module 40 may use the distribution data to generate a cross-product or cross-aisle or cross-department user interfaces. Finally, the communication module 40 may communicate the generated user interface to the client machine 20.

At operation 438, at the client machine 20, the web client 16 receives and displays the user interface.

While the above described example embodiment includes the generation and communication of a user interface, it will readily be appreciated that other embodiments may generate and communicate information to be presented to a user, for example via a graphical user interface generated at the client side, or in some other manner (e.g., an audio interface, machine interface, media interface). As such, the communicated information may comprise, for example, eXtensible Markup Language (XML) data that is processed and communicated to a user via an interface.

Further, while the presentation of information has been described in the context of a client-server network environment, embodiments may be deployed in a standalone computer system environment, or in a peer-to-peer network environment.

Figure 22:
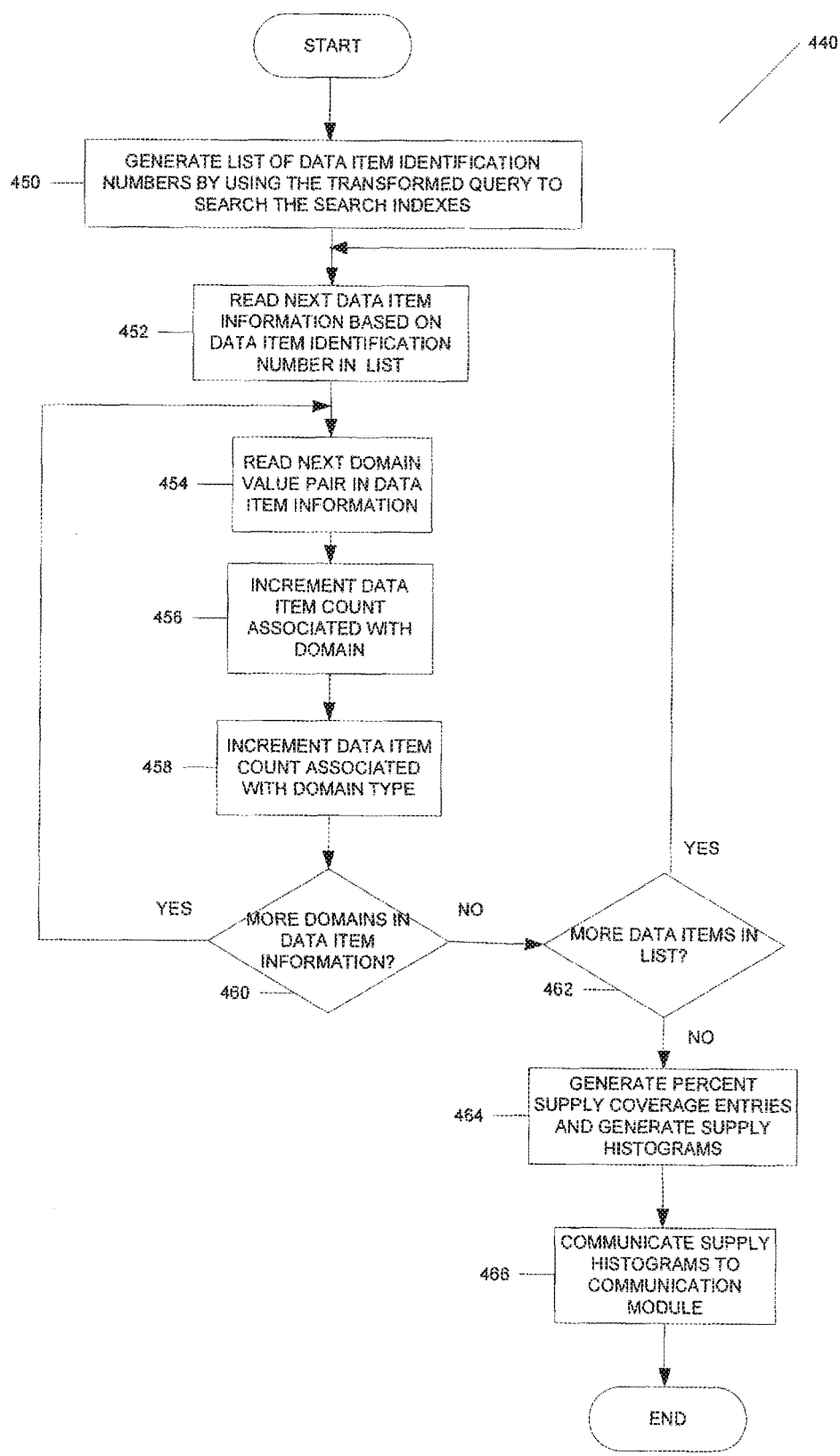
FIG. 22 is a flowchart illustrating a method, according to an embodiment to generate supply histograms.

FIG. 22 is a flowchart illustrating a method 440, according to an embodiment, to generate supply histograms 320. The method 440 commences at operation 450 with the search index engine 54 generating a list of data item identification numbers 266 based on the transformed query. For example, all data items identification numbers 266 associated with the aspect-value pairs 204 "Brand=Anne Klein" or "Color=ruby" in the search index 64 may be included on the list. In addition, all data item identification numbers 266 associated with the keywords "AK" AND "shoes" AND "ruby" in the search index 64 may be also be included on the list.

At operation 452, the search index engine 54 may read the next data item information 270 from the data item search information 66 based on the data item identification number 266 in the list.

At operation 454 the search index engine 54 reads the next domain-value pair 201 in the data item information 270.

At operation 456, the search index engine 54 increments the data item count 280 that may be associated with the current domain 205 and at operation 458 the search index engine 54 may increment a total data item count 282 associated with the domain type. For example, the domain type may include a product, aisle, or department.

At decision operation 460, the search index engine 54 may determine whether there are more domain-value pairs 201 in the data item information 270. If there are more domain-value pairs 201, a branch is made to operation 454. Otherwise a branch is made to decision operation 462.

At decision operation 462, the search index engine 54 may determine if there are more data item identification numbers 266 in the list. If there are more data item identification numbers 266, a branch is made to operation 452. Otherwise a branch is made to operation 464.

At operation 464, the search index engine 54 may generate and store supply information 331 in the form of percent supply coverage entries in the supply histograms 320. For example, the search index engine 54 may divide the data item count 280 for each of the domains 205 in the respective work areas 274, 276, 278 by the appropriate total data item count 282 (e.g., product, aisle, department) to generate a percent supply coverage that may be stored according to domain 205 in the supply histograms 320 (e.g., product histogram 326, the aisle histogram 328 and department histogram 330). In another embodiment, the communication module 40 may generate and store supply information 331 in the form of percent supply coverage entries in the supply histograms 320.

At operation 466, the search index engine 54 communicates the supply histograms 326, 328, 330 to the communication module 40 and the process ends.

Figure 23:
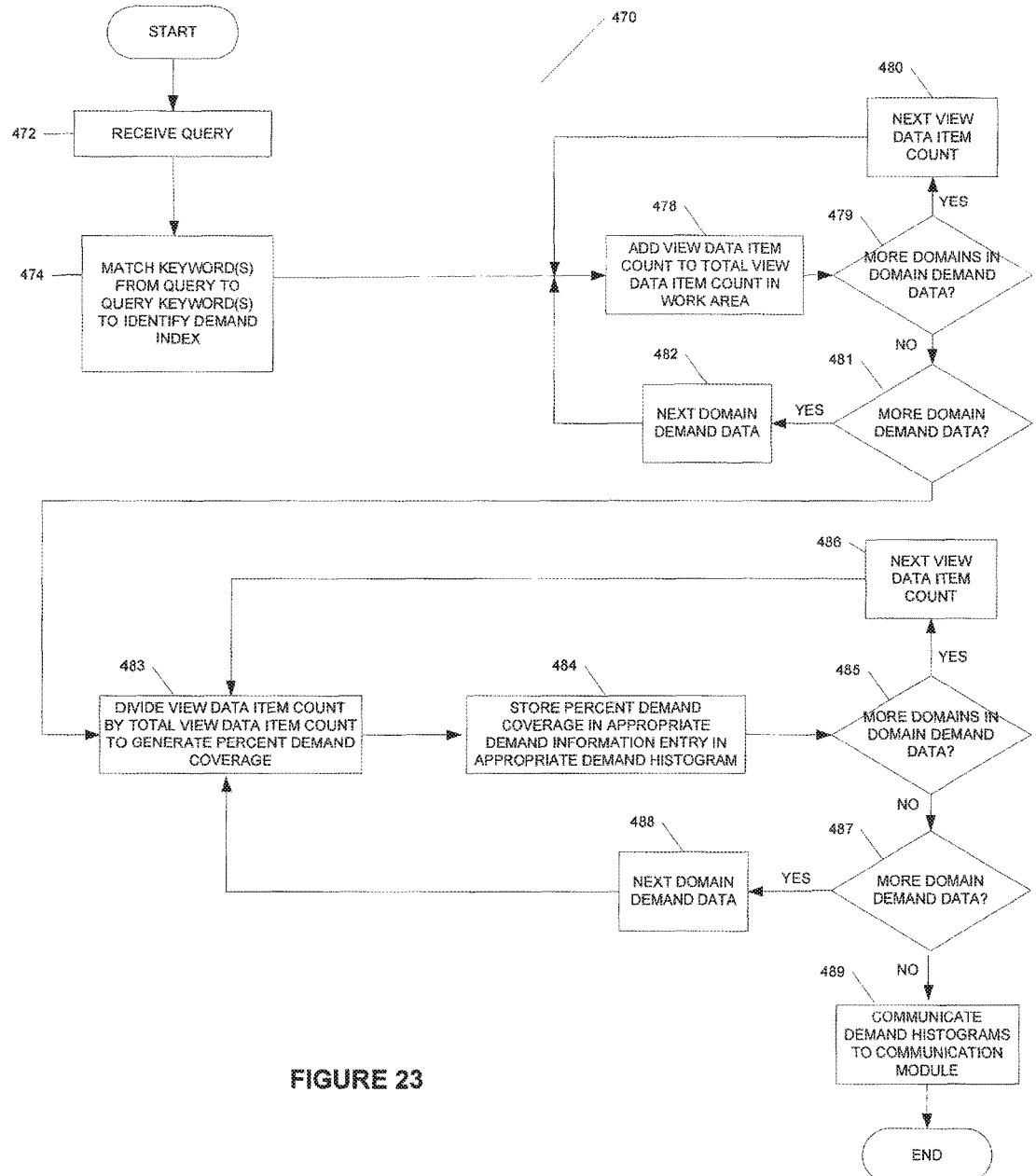
FIG. 23 is a flowchart illustrating a method, according to an embodiment, to generate demand histograms.

FIG. 23 is a flowchart illustrating a method 470, according to an embodiment, to generate demand histograms 322. The method 470 commences at operation 472 with the demand data engine 56 receiving the query as entered at the client machine 20. For example, the demand data engine 56 may receive the query "AK shoes ruby." At operation 474, the demand data engine 56 may compare the constraints (e.g., keywords) in the query with the constraints (e.g., query keywords 286) in the demand data indexes 70 to identify a matching demand index 284. In one embodiment the demand index 284 may include query keywords 286 (e.g., "AK shoes ruby") that correspond to the keywords "AK shoes ruby." In another embodiment, multiple demand indexes 284 may be used to match each query keyword 286 in the query (e.g., "AK" and "shoes" and "ruby").

At operation 478, the demand data engine 56 adds the view data item count 290 associated with a domain to the appropriate total view data item count 308 in the demand data work area 72. For example, the demand data engine 56 may add the view data item count 290 associated with a product domain to the total view data item count 308 in the product work area 300.

At decision operation 479, the demand data engine 56 determines if there are more domains 205 to process in the domain demand data 287 (e.g., corresponding to products, aisles or departments). If there are more domains 205, a branch is made to operation 480. Otherwise a branch is made to decision operation 481.

At operation 480, the demand data engine 56 reads the next view data item count 290 (e.g., corresponding to the next domain) from the domain demand data 287. At decision operation 481, the demand data engine 56 determines if there is another domain demand data 287 (e.g., product domains, aisle domain, or department domains). If there is more domain demand data 287 a branch is made operation 482. Otherwise a branch is made to operation 483.

At operation 482 the demand data engine 56 reads the next domain demand data 287 (e.g., corresponding to products, aisles or departments).

At operation 483, the demand data engine 56 divides the current view data item count 290, corresponding to a domain, by the appropriate total view data item count 308 (e.g., product work area 300, aisle work area 302, department work area 304) to generate demand information 333.

At operation 484, the demand data engine 56 stores the demand information 333 according to domain in the appropriate demand histogram (e.g., product histogram 332 or aisle histogram 334 or department histogram 336).

At decision operation 485, the demand data engine 56 determines if there are more domains 205 to process in the domain demand data 287 (e.g., corresponding to products, aisles or departments). If there are more domains 205, a branch is made to operation 486. Otherwise a branch is made to decision operation 487.

At operation 486, the demand data engine 56 reads the next view data item count 290 (e.g., corresponding to the next domain) from the domain demand data 287. At decision operation 487, the demand data engine 56 determines if there is more domain demand data 287 (e.g., product domains, aisle domain, or department domains). If there is more domain demand data 287 a branch is made operation 488. Otherwise a branch is made to operation 489.

At operation 488 the demand data engine 56 reads the next domain demand data 287 (e.g., corresponding to products, aisles or departments).

At operation 489, the demand data engine 56 communicates the demand histograms 322 to the communication module 40 at the front-end servers 101.

Figure 24:
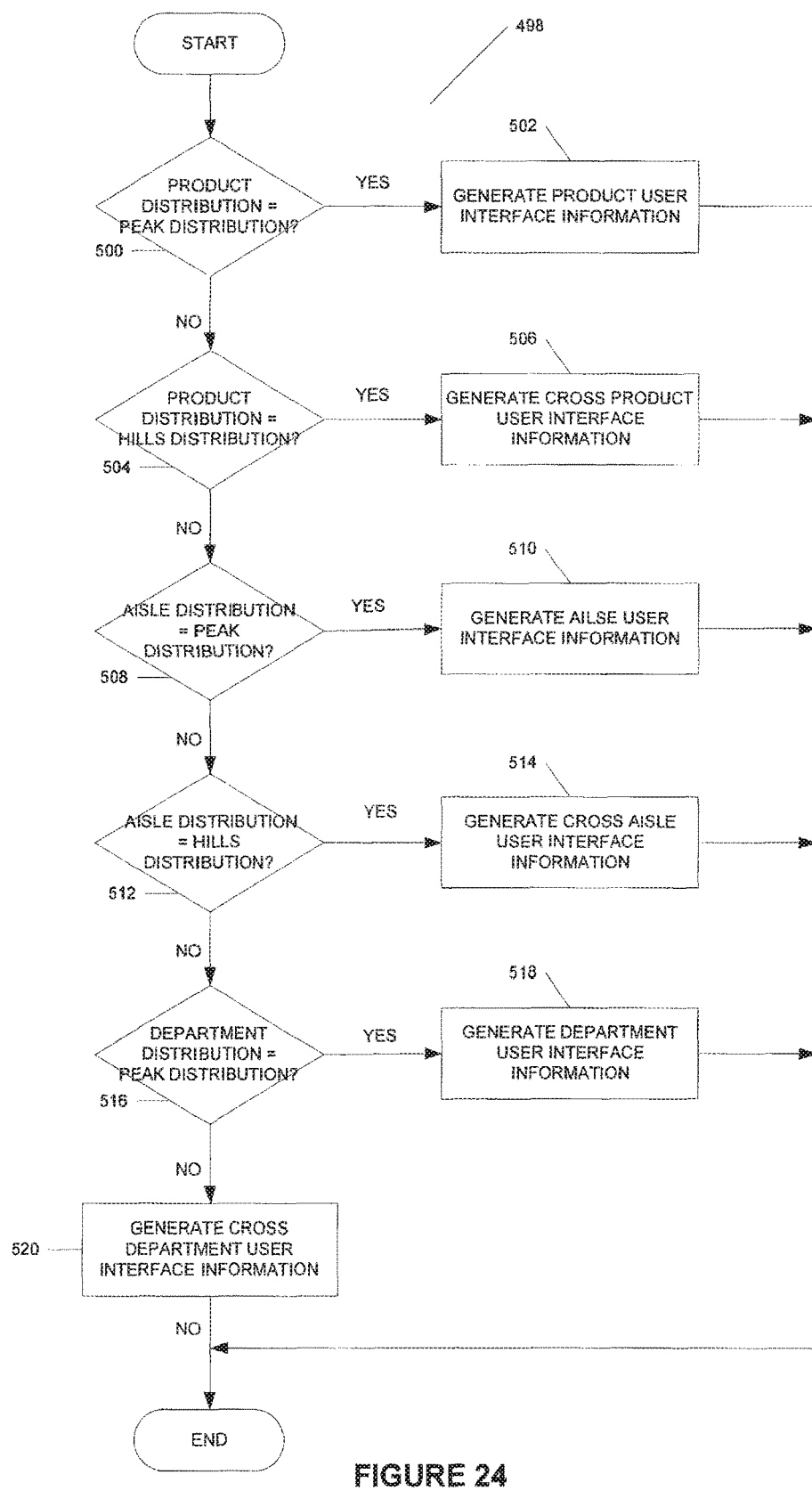
FIG. 24 is a flowchart illustrating a method, according to an embodiment, to generate interface information.

FIG. 24 is a flowchart illustrating a method 498, according to an embodiment, to generate interface information. In the present example the interface information generated is user interface information; however, it will be appreciated by those skilled in the art that interface information may also include machine interface information (e.g., SGML) to communicate with a machine (e.g., client, server, peer to peer), audio interface information (e.g., sound), or a media interface information (e.g., media). The method 498 commences at decision operation 500 with the communication module 40 determining if the product histogram 338 exhibits the peak distribution 2. For example, the communication module 40 may compare the product histogram 338 (e.g., percent total coverage) to a predetermined peak distribution 2. If the product histogram 338 matches the peak distribution 2, then a branch is made to operation 502. Otherwise, a branch is made to decision operation 504.

At operation 502, the communication module 40 generates product user interface information based on the position of the peak in the product histogram 338. For example, if product domains 132 A, B, and C were respectively associated with percent total coverage of 10%, 80%, and 10% then product user interface information for product domain B may be generated.

At decision operation 504, the communication module 40 determines if the product histogram 338 exhibits the hills distribution 4. For example, the communication module 40 may compare the product histogram 338 (e.g., percent total coverage) to the hills distribution 4. If the product histogram 338 matches the hills distribution 4 then, a branch is made to operation 506. Otherwise, a branch is made to decision operation 508.

At operation 506, the communication module 40 generates cross-product user interface information based on the position of the hills in the product histogram 338. For example, if the product domains 132 A, B, C, D, E, F were respectively associated with percent total coverage of 3%, 30%, 3%, 30%, 4%, 30%, then cross-product user interface information for product domains B, D, and F may be generated.

At decision operation 508, the communication module 40 may determine if the aisle histogram 340 exhibits the peak distribution. For example, the communication module 40 may compare the aisle histogram 340 (e.g., percent total coverage) to the predetermined peak distribution 2. If the aisle histogram 340 matches the peak distribution 2, then a branch is made to operation 510. Otherwise, a branch is made to decision operation 512.

At operation 510, the communication module 40 generates aisle user interface information based on the position of the peak in the aisle histogram 340. For example, if the aisle domains 130 A, B, and C were respectively associated with percent total coverage of 10%, 80%, and 10% then the aisle user interface information for aisle domain B may be generated.

At decision operation 512, the communication module 40 determines if the aisle histogram 340 exhibits the hills aisle distribution 4. For example, the communication module 40 may compare the aisle histogram 340 (e.g., percent total coverage) to the hills distribution 4. If the aisle histogram 340 matches the hills distribution 4 then, a branch is made to operation 514. Otherwise, a branch is made to decision operation 516.

At operation 514, the communication module 40 generates cross-aisle user interface information. For example, if the product domains 132 A, B, C, D, E, F were respectively associated with the percent total coverages of 3%, 30%, 3%, 30%, 4%, 30%, then cross aisle user interface information for aisle domains B, D, and F may be generated.

At decision operation 516, the communication module 40 determines if the department histogram 342 exhibits the peak distribution 2. For example, the communication module 40 may compare the department histogram 342 (e.g., percent total coverage) to the peak distribution 2. If the department histogram 342 matches the peak distribution 2 then a branch is made to operation 518. Otherwise, a branch is made to operation 520.

At operation 518, the communication module 40 generates department user interface information based on the position of the peak as determined from the department histogram 342. For example, if the department domains 128 A, B, and C were respectively associated with percent total coverage of 10%, 80%, and 10%, then department user interface information for department domain B may be generated.

At operation 520, the communication module 40 generates cross-aisle domain information user interface information and the process ends. For example, if the department domains 128 A, B, C, D, E, F were respectively associated with percent total coverage of 3%, 30%, 3%, 30%, 4%, 30%, then cross department user interface information for department domains B, D, and F may be generated.

Figure 25:
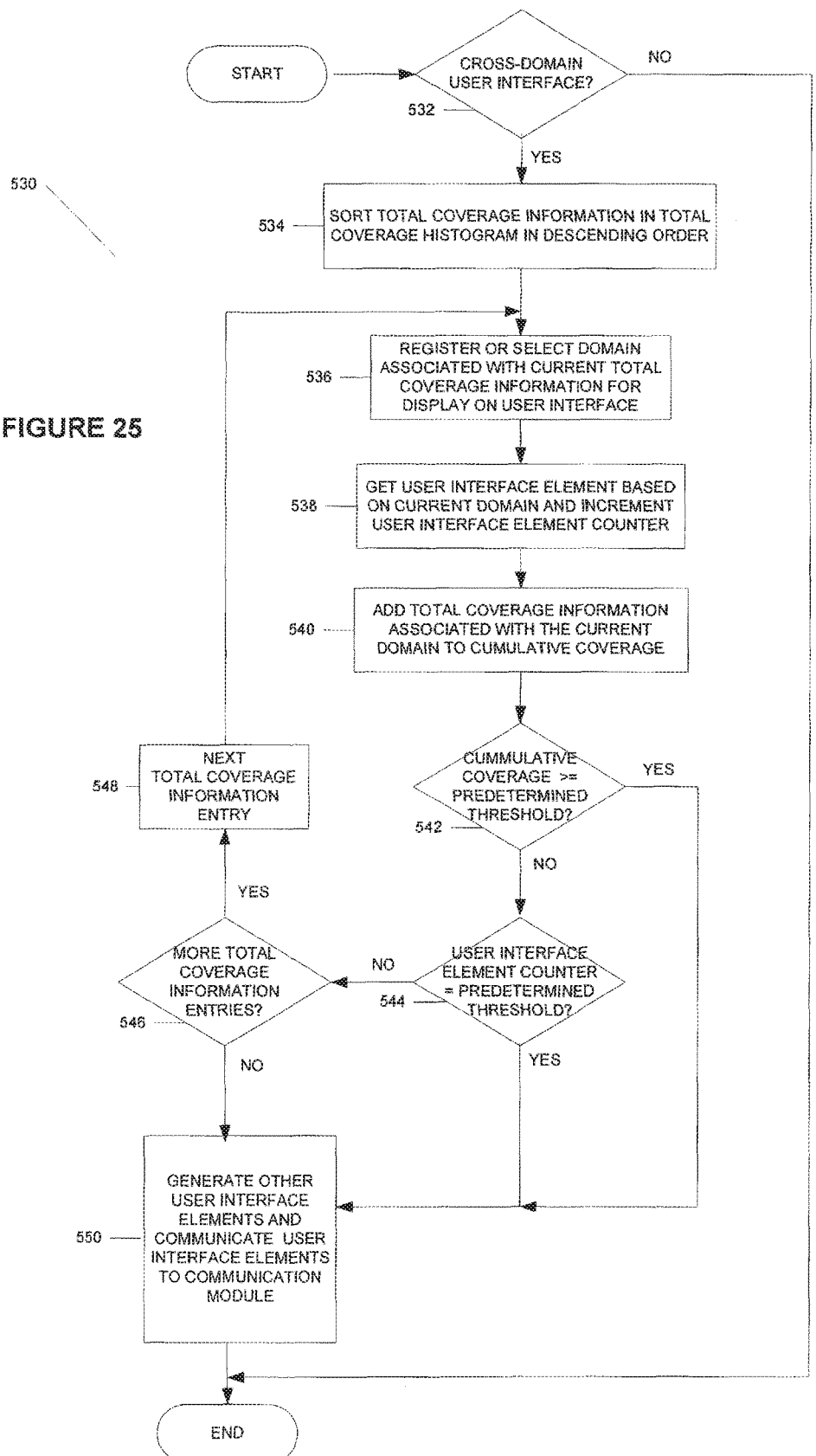
FIG. 25 is a flowchart illustrating a method to generate distribution data.

FIG. 25 is a flowchart illustrating a method 530 to generate distribution data, according to an embodiment. In the present example the distribution data is used to select and position user interface elements on a user interface; however, it will be appreciated by those skilled in the art that distribution data may be generated to select and position machine interface elements for a machine interface (e.g., SGML), audio interface elements fore an audio interface, media interface elements for a media interface, or some other type of interface. The method 530 commences at decision operation 532 with the domain sort module 44 determining if a cross-domain user interface (e.g., cross product user interface or cross aisle user interface or cross department user interface) has been identified by the communication module 40 to be generated. If a cross-domain user interface has been identified, a branch is made to operation 534. Otherwise, the process ends.

At operation 534, the domain sort module 44 sorts the total coverage information 335 entries in the total coverage histogram 324 (e.g., product histogram 338 or aisle histogram 340, or department histogram 342) into descending order (e.g., high to low). Each total coverage information 335 entry is associated with a domain 205. The domain sort module 44 maintains the association between the total coverage information 335 entry and the domain 205 while sorting. In one embodiment, the total coverage information 335 entries may be represented as percent total coverage, as previously described.

At operation 536, the domain sort module 44 registers the domain 205 associated with the current total coverage information 335 for display on the user interface. For example, the product domain 132 "Shoes" may be associated with the current total coverage information 335.

At operation 538, the domain sort module 44 gets a user interface element based on the current domain and increments a user interface element counter 537. At operation 540, the domain sort module 44 adds the total coverage information 335 associated with the current domain to a register that records cumulative coverage.

At decision operation 542, the domain sort module 44 determines if the cumulative coverage is greater than or equal to a predetermined threshold. If the cumulative coverage is greater or equal to the predetermined threshold, then a branch is made to operation 550. Otherwise, a branch is made to decision operation 544. For example, the predetermined threshold may be eighty percent.

At decision operation 544, the domain sort module 44 determines if the user interface element counter 537 is equal to a predetermined threshold (e.g., maximum user interface elements on a cross-domain user interface). In one embodiment the maximum user interface elements may be ten. If the user interface element counter 537 is equal to the predetermined threshold, then a branch is made to operation 550. Otherwise, a branch is made to decision operation 546.

At decision operation 546, the domain sort module 44 determines if there is another total coverage information 335 entry in the total coverage histogram 324 (e.g., product histogram 338 or aisle histogram 340 or department histogram 342). If there is more total coverage information 335, then a branch is made to operation 548. Otherwise, a branch is made to operation 550. At operation 548, the domain sort module 44 reads the next total coverage information 335 entry from the total coverage histogram 324 (e.g., product histogram 338 or aisle histogram 340 or department histogram 342).

At operation 550, the domain sort module generates other user interface elements for the user interface and communicates the user interface elements to the communication module 40.

Figure 26:
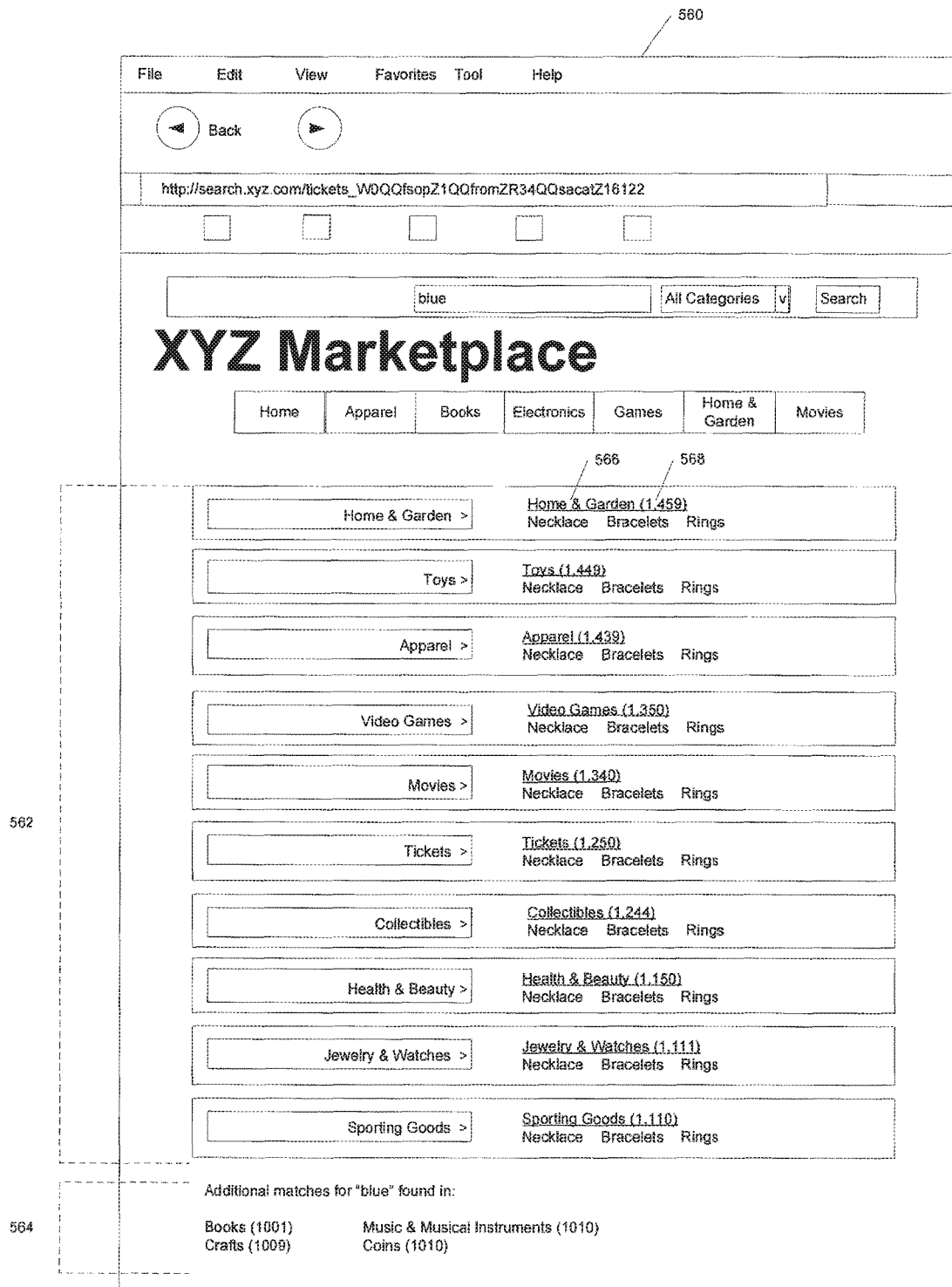
FIGS. 26-29 are diagrams illustrating user interfaces, according to an embodiment.

FIG. 26 is a diagram illustrating a cross department user interface 560, according to an embodiment. The cross department user interface 560 may be generated based on a hills distribution 4 and is shown to include user interface elements 562, 564, 566, and 568. The ten user interface elements 562 represent ten department domains 128 (e.g., Home & Garden, Toys, Apparel, etc.) that may appear on the user interface 560 from top to bottom according to descending and respectively associated total coverage information 335. The ten department domains 128 equal the predetermined threshold of maximum user interface elements that may be defined for a cross-domain user interface. Other embodiments may include other predetermined thresholds. The user interface 560 illustrates that the predetermined threshold for maximum user interface elements (e.g., ten) was reached before the predetermined threshold for cumulative coverage information. The user interface elements 564 represent department domains 128 that were respectively associated with total coverage information 335 entries that were lower than the total coverage information 335 entries respectively associated with the user interface elements 562. The above remarks may also apply to the cross aisle user interface and the cross product user interface. The user interface elements 562 and 564 representing the aisle domains 130 on the cross aisle user interface 560 and the user interface elements 562 and 564 representing the product domains 132 on the cross aisle user interface 560.

Figure 27:
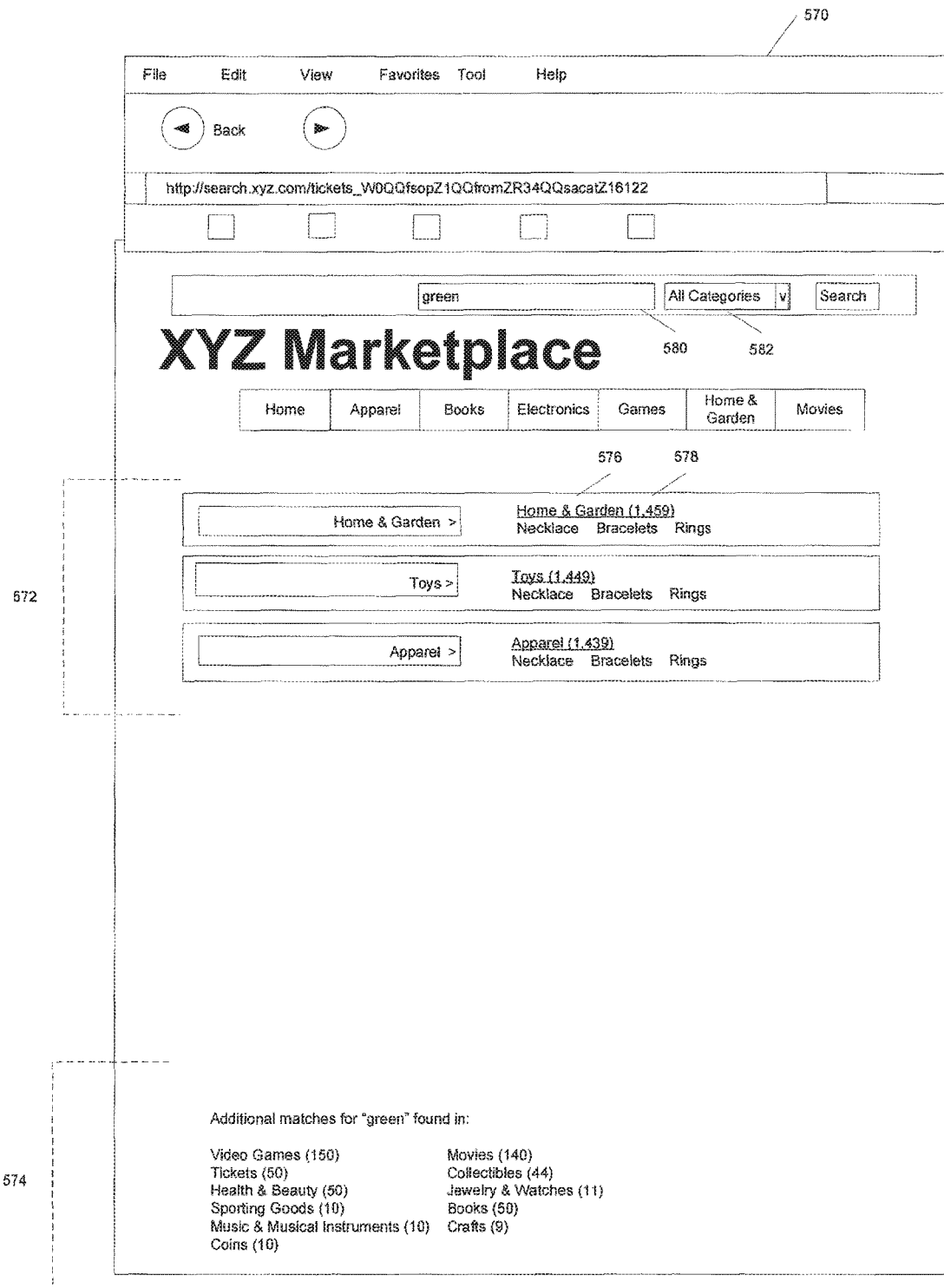

FIG. 27 is a diagram illustrating a cross department user interface 570, according to an embodiment. The user interface 570 is shown to include user interface elements 572, 574, 576, 578, 580 and 582. The three user interface elements 572 respectively representing the Home & Garden, Toys, Apparel department domains 128. The three user interface elements 572 appear on the user interface 570 from top to bottom according to a descending sort of respectively associated total coverage information 335. The cross-department user interface 570 illustrates that the predetermined threshold for maximum cumulative coverage was reached before the predetermined threshold for maximum user interface elements. For example, the department domains 128 "Home & Garden", "Toys" and "Apparel" may be respectively associated the total coverage information 335 of 30%, 30%, 28%. The above remarks may also apply to the cross aisle user interface and the cross product user interface. The user interface elements 572 and 574 representing the aisle domains 130 on the cross aisle user interface 570 and the user interface elements 562 and 564 representing the product domains 132 on the cross aisle user interface 570.

The eleven user interface elements 574 represent the "Video Games", "Tickets", "Health & Beauty", "Sporting Goods", "Music & Musical Instruments", "Coins", "Movies", "Collectibles", "Jewelry & Watches", "Books", and "Crafts" department domains 128. The user interface elements 564 may be associated to total coverage information 335 of 3%, 1%, etc. The user interface element 580 represents a query dialog box that includes a query "green" that may have been entered by a user thereby requesting the information storage and retrieval platform 12 to search for data items 65 that contain the keyword "green." The user interface element 582 represents a category selector 582 which is set to search "All Categories" for data items 65. The user interface element 576 represents a domain name (e.g., "Home & Garden", "Toys", etc.) and the user interface element 578 represents the number data items 65 found by the information storage and retrieval platform 12 based on the query "green" in "All categories."

The above remarks may also apply to the cross aisle user interface and the cross product user interface. The user interface elements 572 and 574 representing the aisle domains 130 on the cross aisle user interface 560 and the user interface elements 572 and 574 representing the product domains 132 on the cross product user interface.

Figure 28:

FIG. 28 is a diagram illustrating a department user interface 590, according to an embodiment. The department user interface 590 may be generated based on the peak distribution 2 and includes a user interface element 592 representing the "Home & Garden" department domain 128. The user interface 590 further includes user interface elements 594 representing aisle domains 130 that may be organized under the "Home & Garden" department domain 128. The above remarks may also apply to the aisle user interface, the user interface element 592 representing the aisle domain 130 and the user interface elements 594 representing the product domains 132.

Figure 29:
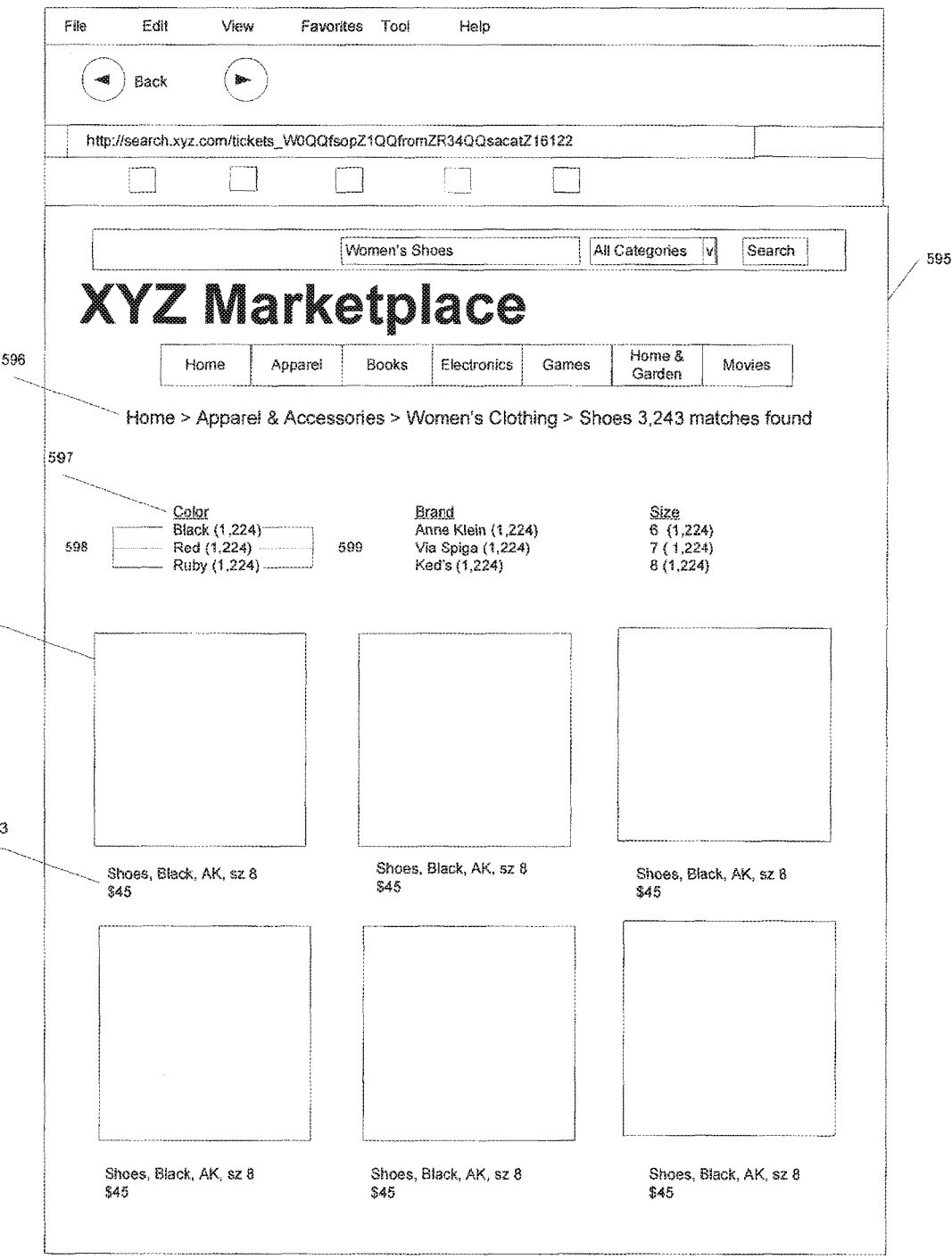

FIG. 29 is a diagram illustrating a product user interface 595, according to an embodiment. The product user interface 595 is shown to include user interface elements 596, 597, 598, 599, 601, and 603. The user interface element 596 represents a domain path that includes the "Apparel & Accessories" department domain 178, the "Women's Clothing" aisle domain 168, the "Shoes" product domain 166 and the number of data items 65 found based on the query "Women's Shoes." The user interface element 597 represents the aspect 206 "color." The user interface elements 598 represent the values 208 "Black", "Red", and "Ruby" that may be associated with the aspect 206 "Color." The user interface elements 599 represent counts of data items 65 that may be associated with the corresponding color. The user interface element 601 is a picture or graphic for a data item 65 that was found with the query. The user interface element 603 includes information that may be stored in the data item 65 that was found with the query. The above remarks may also apply to the aisle user interface and the product user interface.

Figure 30:
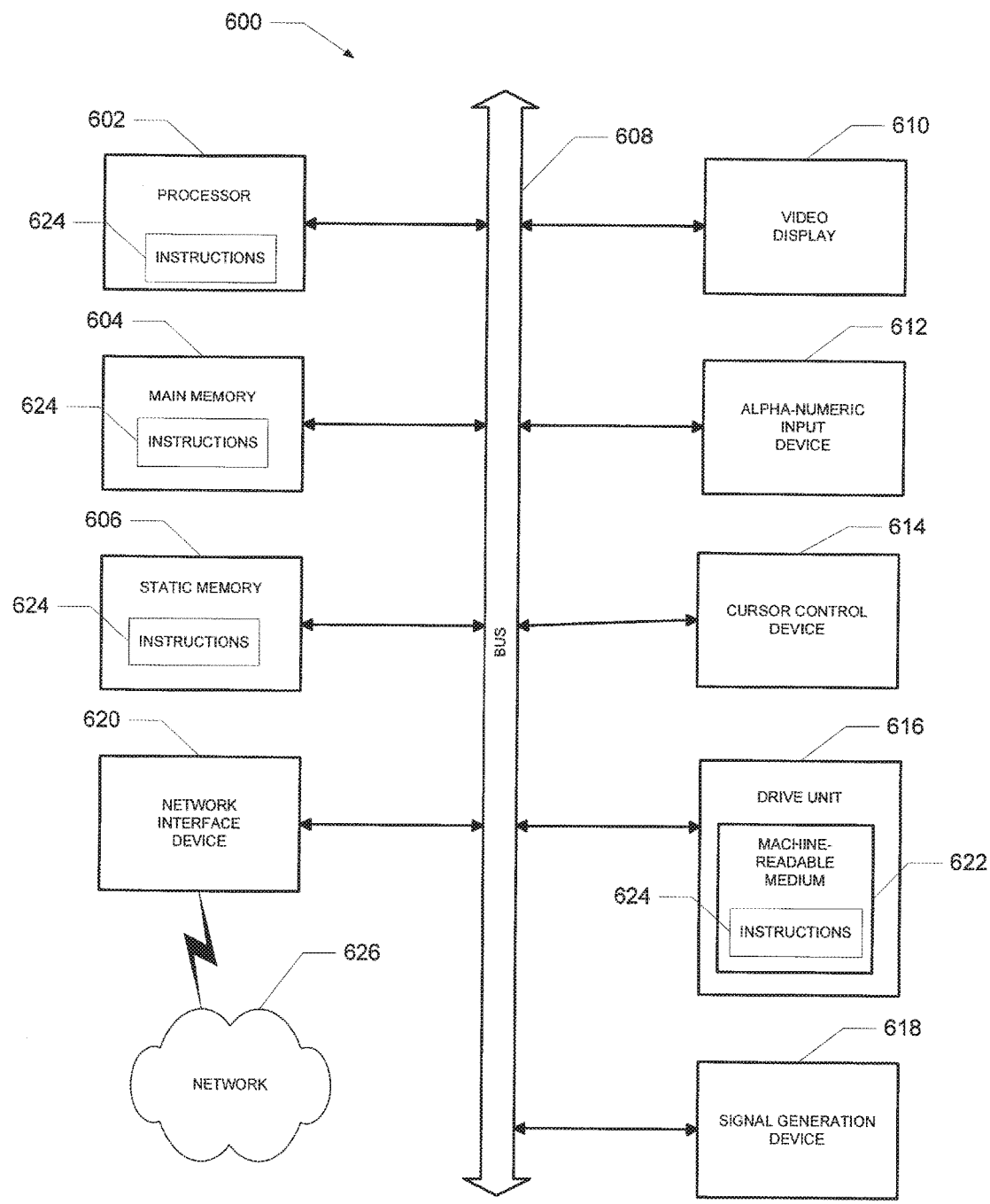
FIG. 30 is a block diagram of a machine, according to an example embodiment, including instructions to perform any one or more of the methodologies described herein.

FIG. 30 shows a diagrammatic representation of machine in the example form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 310 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

Thus, a method and system to communicate information has been described. Although the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

We claim:
1. A system comprising:
a processor and executable instructions accessible on a computer-readable medium that, when executed, cause the processor to perform operations comprising:
receiving a first query, over a network, from a client machine, the first query containing at least one constraint including a first constraint;

retrieving a first plurality of data items from a database based on the first query, the first plurality of data items describing items being offered for sale on a network-based marketplace;

generating a product distribution based on a domain structure, a count of data items from the first plurality of data items for each product domain in a first plurality of product domains that are used to identify data items, and a count of requests to view data items from a second plurality of data items for each product domain in the first plurality of product domains, wherein the domain structure is based on domains identified in a mapping of selected categories of data items in sell-side data to domains in buy-side data, wherein the mapping is based on sell-side data to buy-side data association rules that identify domains as a function of mapping selected categories of data items in the sell-side data to domains in buy-side data, wherein the sell-side data is associated with data items from the first plurality of data items and the buy-side data is associated with the requests to view data items from the second plurality of data items identifying user interface information with a communication module, the identifying of the communication module comprising:

identifying whether the product distribution exhibits a type of distribution from a plurality of types of distributions by comparing the product distribution with at least one of a peak distribution hills distribution, and flat distribution to identify user interface information to generate;

generating the user interface information based on the type of distribution, wherein the user interface information includes at least one user interface element being positioned on the user interface based on the product distribution; and communicating a user interface, over the network, to the client machine, the user interface including the user interface information.

2. The system of claim 1, wherein the at least one interface element to respectively represent at least one product domain.

3. The system of claim 2, wherein the operations are further comprising:
counting the at least one user interface element; and
determining whether a predetermined threshold is exceeded.

4. The system of claim 2, wherein the product distribution is total coverage information distributed across the first plurality of product domains.

5. The system of claim 4, wherein the operations are further comprising positioning the at least one user interface element on the user interface based on a descending order of each domain of the total coverage product information.

6. The system of claim 5, wherein the operations are further comprising adding the plurality of total coverage product information to a plurality of total coverage aisle information to a plurality of total coverage department information to generate cumulative coverage.

7. The system of claim 6, wherein the operations are further comprising determining whether the cumulative coverage exceeds a predetermined threshold.

8. The system of claim 4, wherein the operations are further comprising:
generating a supply product distribution based on the first plurality of data items, the supply product distribution utilizing the first plurality of domains, the supply product distribution including the first plurality of data items distributed across the first plurality of product domains, the supply product distribution including the count of data items for each product domain in the first plurality of product domains; and generating a demand product distribution based on a plurality of requests to view a second plurality of data items, the demand product distribution including the plurality of requests to view a second plurality of data items distributed across the first plurality of product domains, the demand product distribution including the count of requests to view data items for each product domain in the first plurality of product domains; and wherein the supply product distribution includes a plurality of supply information and the demand product distribution includes a plurality of demand information.

9. The system of claim 8, wherein the operations are further comprising:
associating the plurality of requests to view data items with the first plurality of product domains.

10. A method comprising:
receiving a first query, over a network, from a client machine, the first query containing a first constraint;
retrieving a first plurality of data items from a database based on the first query, the first plurality of data items describing items being offered for sale on a network-based marketplace;

generating a product distribution based on a domain structure, a count of data items from the first plurality of data items for each product domain in a first plurality of product domains that are used to identify data items and a count of requests to view data items from a second plurality of data items for each product domain in the first plurality of product domains, wherein the domain structure is based on domains identified in a mapping of selected categories of data items in sell-side data to domains in buy-side data, wherein the mapping is based on sell-side data to buy-side data association rules that identify domains as a function of mapping selected categories of data items in the sell-side data to domains in buy-side data wherein the sell-side data is associated with data items from the first plurality of data items and the buy-side data is associated with the requests to view data items from the second plurality of data items;

identifying user interface information with a communication module, the identifying of the communication module comprising:

identifying whether the product distribution exhibits a type of distribution from a plurality of types of distributions by comparing the product distribution with at least one of a peak distribution hills distribution, and flat distribution to identify user interface information to generate;

generating interface information based on the type of distribution, wherein the user interface information includes at least one user interface element being positioned on the user interface based on the product distribution; and communicating a user interface, over the network, to the client machine, the user interface including the interface information.

11. The method of claim 10, wherein the at least one interface element to respectively represent at least one product domain.

12. The method of claim 11, wherein the operations are further comprising:

counting the at least one user interface element; and determining whether a predetermined threshold is exceeded.

13. The method of claim 11, wherein the product distribution is total coverage product information distributed across the first plurality of domains.

14. The method of claim 13, wherein the operations are further comprising positioning the at least one user interface element on the user interface based on a descending order of each domain of the total coverage product information.

15. The method of claim 14, wherein the operations are further comprising adding the plurality of total coverage product information to a plurality of total coverage aisle information to a plurality of total coverage department information to generate cumulative coverage.

16. The method of claim 15, wherein the operations are further comprising determining whether the cumulative coverage exceeds a predetermined threshold.

17. The method of claim 13, wherein the operations are further comprising:

generating a supply product distribution based on the first plurality of data items, the supply product distribution utilizing the first plurality of product domains, the supply product distribution including the first plurality of data items distributed across the first plurality of product domains, the supply product distribution including the count of data items for each product domain in the first plurality of product domains;

generating a demand product distribution based on a plurality of requests to view a second plurality of data items, the demand product distribution including the plurality of requests to view a second plurality of data items distributed across the first plurality of product domains, the demand product distribution including the count of requests to view data items for each product domain in the first plurality of product domains; and wherein the supply product distribution includes a plurality of supply information and the demand product distribution includes a plurality of demand information.

18. The method of claim 17, wherein the operations are further comprising:

associating the plurality of requests to view data items with the first plurality of product domains.

19. A machine readable medium having no transitory signals and storing a set of instructions that, when executed by a machine, cause the machine to perform operations comprising:

receiving a first query, over a network, from a client machine, the first query containing a first constraint;

retrieving a first plurality of data items from a database based on the first query, the first plurality of data items describing items being offered for sale on a network-based marketplace;

generating a product distribution based on a domain structure, a count of data items from the first plurality of data items for each product domain in a first plurality of product domains that are used to identify data items, and a count of requests to view data items from a second plurality of data items for each product domain in the first plurality of product domains, wherein the domain structure is based on domains identified in a mapping of selected categories of data items in sell-side data to domains in buy-side data, wherein the mapping is based on sell-side data to buy-side data association rules that identify domains as a function of mapping selected categories of data items in the sell-side data to domains in buy-side data, wherein the sell-side data is associated with data items from the first plurality of data items and the buy-side data is associated with the requests to view data items from the second plurality of data items, identifying user interface information with a communication module, the identifying of the communication module comprising:

identifying whether the product distribution exhibits a type of distribution from a plurality of types of distributions by comparing the product distribution with at least one of a peak distribution hills distribution, and flat distribution to identify user interface information to generate, generating interface information based on the type of distribution, wherein the user interface information includes at least one user interface element being positioned on the user interface based on the product distribution; and communicating a user interface, over the network, to the client machine, the user interface including the interface information.

20. The machine readable medium of claim 19, wherein the at least one user interface element to respectively represent at least one product domain.

* * * * *